(12) United States Patent
Taguchi et al.

(10) Patent No.: US 10,288,498 B2
(45) Date of Patent: May 14, 2019

(54) FORCE DETECTION DEVICE

(71) Applicant: DENSO CORPORATION, Kariya, Aichi-pref. (JP)

(72) Inventors: Rie Taguchi, Nagakute (JP); Kentaro Mizuno, Nagakute (JP); Takashi Katsumata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/546,729

(22) PCT Filed: Apr. 4, 2016

(86) PCT No.: PCT/JP2016/001895
§ 371 (c)(1),
(2) Date: Jul. 27, 2017

(87) PCT Pub. No.: WO2016/163111
PCT Pub. Date: Oct. 13, 2016

(65) Prior Publication Data
US 2018/0024014 A1    Jan. 25, 2018

(30) Foreign Application Priority Data

Apr. 6, 2015  (JP) .................................. 2015-77773
Apr. 22, 2015  (JP) .................................. 2015-87566

(51) Int. Cl.
*G01L 1/20* (2006.01)
*G01L 1/22* (2006.01)
(Continued)

(52) U.S. Cl.
CPC ............... *G01L 1/18* (2013.01); *G01L 1/205* (2013.01); *G01L 1/2243* (2013.01);
(Continued)

(58) Field of Classification Search
CPC .... G01B 7/16; G01L 1/22; G01L 1/20; G01L 1/18; G01L 9/0052; G01L 1/2262; G01L 23/10; G01L 9/00; H01C 10/10
See application file for complete search history.

(56) References Cited

U.S. PATENT DOCUMENTS 4,454,771 A * 6/1984 Shimazoe ................. G01L 1/18
                                                                73/777
4,680,606 A * 7/1987 Knutti ....................... G01L 1/18
                                                                257/419
(Continued)

FOREIGN PATENT DOCUMENTS

JP   2001-304997 A    10/2001
JP   2001304997    * 10/2003    ............... G01L 9/00
(Continued)

*Primary Examiner* — Lisa M Caputo
*Assistant Examiner* — Brandi N Hopkins
(74) *Attorney, Agent, or Firm* — Posz Law Group, PLC

(57) ABSTRACT

A force detection device includes: a substrate; and a force transmission block. The substrate includes: a mesa gauge arranged on a principal plane of the substrate and providing a bridge circuit; a connection region arranged on the principal plane; and a sealing portion surrounding all around the mesa gauge and connected to the force transmission block. The mesa gauge includes: a first mesa gauge extending in a first direction; and a second mesa gauge extending in a second direction and spaced apart from the first mesa gauge. The connection region electrically connects the one end of the first mesa gauge and the one end of the second mesa gauge.

10 Claims, 10 Drawing Sheets

(51) Int. Cl.
*G01L 9/00* (2006.01)
*G01L 1/18* (2006.01)
*H01C 10/10* (2006.01)

(52) U.S. Cl.
CPC .......... *G01L 1/2275* (2013.01); *G01L 9/0052* (2013.01); *H01C 10/10* (2013.01)

(56) References Cited

U.S. PATENT DOCUMENTS

| | | | | |
|---|---|---|---|---|
| 5,773,728 | A * | 6/1998 | Tsukada | G01L 1/18 338/5 |
| 8,171,806 | B2 * | 5/2012 | Mizuno | G01L 9/0098 73/777 |
| 2003/0101828 | A1 * | 6/2003 | Omura | G01L 1/18 73/862.474 |
| 2010/0206092 | A1 | 8/2010 | Mizuno et al. | |
| 2017/0102274 | A1 * | 4/2017 | Mizuno | G01L 1/18 |

FOREIGN PATENT DOCUMENTS

| | | |
|---|---|---|
| JP | 2004-132811 A | 4/2004 |
| JP | 2006-058266 A | 3/2006 |
| JP | 2015-001495 A | 1/2015 |

\* cited by examiner

FORCE DETECTION DEVICE

CROSS REFERENCE TO RELATED APPLICATIONS

This application is a U.S. national stage application of International Patent Application No. PCT/JP2016/001895 filed on Apr. 4, 2016 and is based on Japanese Patent Applications No. 2015-77773 filed on Apr. 6, 2015, and No. 2015-87566 filed on Apr. 22, 2015, the disclosures of which are incorporated herein by reference.

TECHNICAL FIELD

The present disclosure relates to a force detection device which exploits a piezoresistive effect and includes a mesa gauge.

BACKGROUND ART

A force detection device including a mesa gauge has been developed, examples of which are disclosed in Patent Literatures 1 through 3. A mesa gauge has a piezoresistive effect and an electric resistance value varies with stress. The force detection device is configured to detect a force by exploiting a variance in electrical resistance value.

A force detection device exploiting a piezoresistive effect has been developed, an example of which is disclosed in Patent Literature 1. The force detection device of such a type includes a substrate and a force transmission block. Multiple mesa gauges forming a bridge circuit are provided to a principal plane of the substrate. For example, the multiple mesa gauges forming the bridge circuit are disposed correspondingly to sides of a rectangle. The force transmission block is provided to be in contact with top surfaces of the multiple mesa gauges. When the force transmission block presses the mesa gauges, compressive stress applied to the mesa gauges increases, which causes electric resistance values of the mesa gauges to vary by the piezoresistive effect. A force applied to the force transmission block is detected from a variance in electric resistance value.

Patent Literature 2 proposes a force detection device having a sealing structure in which a force transmission block is joined to a substrate to surround all around multiple mesa gauges. Such a sealed force detection device is capable of having highly-sensitive characteristics because a force applied to the force transmission block is effectively transmitted to the multiple mesa gauges.

In the sealed force detection device, compressive stress applied to the mesa gauges depends on positions of the mesa gauges in a space where the mesa gauges are sealed (hereinafter, referred to as the sealing space). Accordingly, in order to apply compressive stress appropriately to the mesa gauges, it is necessary to dispose the mesa gauges at predetermined positions in the sealing space. In a case where multiple mesa gauges disposed correspondingly to sides of a rectangle form a bridge circuit, a length of each mesa gauge is automatically determined and sensitivity of the mesa gauges can be adjusted only by changing a width of the mesa gauges. Hence, design flexibility of the mesa gauges is low.

PATENT LITERATURE

Patent Literature 1: JP-A-2001-304997
Patent Literature 2: JP-A-2006-058266 (particularly, FIG. 9)
Patent Literature 3: JP-A-2015-001495

SUMMARY

It is an object of the present disclosure to provide a sealed force detection device including multiple mesa gauges which form a bridge circuit and can be designed more flexibly. It is another object of the present disclosure to provide a force detection device capable of improving linearity of output characteristics of the force detection device by improving a non-linear relationship of stress and an electrical resistance value of a mesa gauge.

According to a first aspect of the present disclosure, a force detection device includes: a substrate; and a force transmission block. The substrate includes: a mesa gauge arranged on a principal plane of the substrate and providing a bridge circuit; a connection region arranged on the principal plane and doped with an impurity; and a sealing portion arranged on the principal plane, surrounding all around the mesa gauge, and connected to the force transmission block. The gauge includes: a first mesa gauge extending in a first direction; and a second mesa gauge extending in a second direction different from the first direction and spaced apart from the first mesa gauge. The connection region is disposed between one end of the first mesa gauge and one end of the second mesa gauge, and electrically connects the one end of the first mesa gauge and the one end of the second mesa gauge.

In the force detection device configured as above, the one end of the first mesa gauge and the one end of the second mesa gauge are not directly connected and the connection region is disposed in between. The one end of the first mesa gauge and the one end of the second mesa gauge are electrically connected to the connection region. Hence, a length of the first mesa gauge and a length of the second mesa gauge can be adjusted by adjusting a range of the connection region. Consequently, in the sealed force detection device including the mesa gauge forming a bridge circuit, the first mesa gauge and the second mesa gauge can be designed more flexibly.

According to a second aspect of the present disclosure, a force detection device includes: a mesa gauge (2012, 2014, 2016, 2018); and a fixed resistor (2013, 2015, 2017, 2019) connected in parallel to the mesa gauge. A force is detected by using a variation of a combined resistance of the mesa gauge and the fixed resistor.

In a parallel-connected body formed by connecting a fixed resistor in parallel to a variable resistor exhibiting proportional characteristics in a relationship of stress and an electric resistance value, a relationship of stress and a combined resistance value has upward convex non-linearity as is shown in FIG. 13. In the force detection device configured as above, the fixed resistor is connected in parallel to the mesa gauge having a downward convex non-linear relationship between stress and an electric resistance value. According to the configuration as above, downward convex non-linear characteristics of the mesa gauge and upward convex non-linear characteristics cancel each other out by introducing the fixed resistor. A relationship of stress and a combined resistance value in the parallel-connected body thus has satisfactory linearity. Consequently, linearity of output characteristics of the force detection device can be improved.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
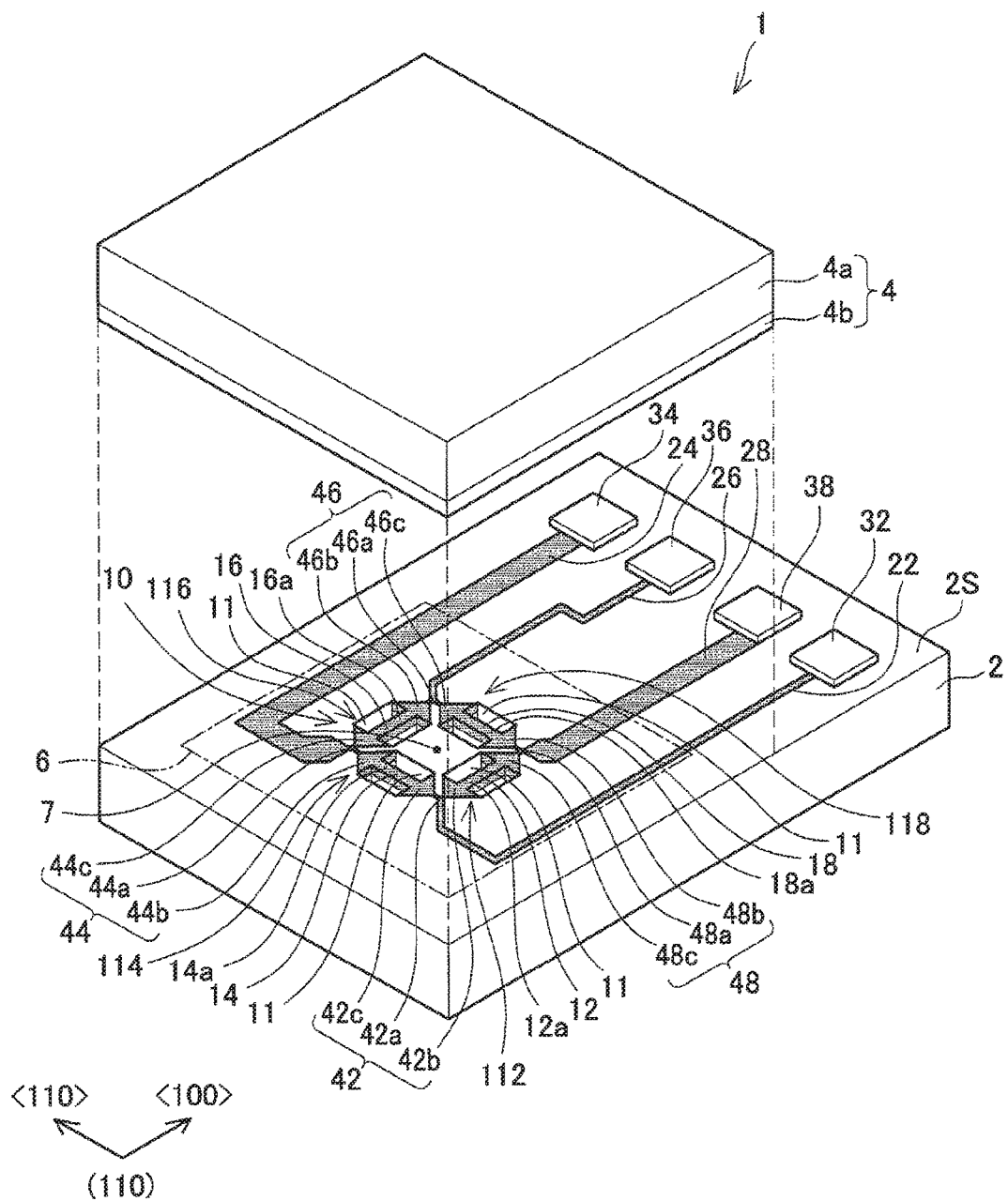
FIG. 1 is an exploded perspective view schematically showing a force detection device of an example to indicate a range of a sealing space defined by a semiconductor substrate and a force transmission block by an alternate long and two short dashes line.

Hereinafter, characteristics of a technique disclosed herein will be described in an organized manner. Every matter described below has its own technical usefulness.

One embodiment of a force detection device disclosed herein is a sensor detecting various pressures, and a detection target may be an air pressure or a fluid pressure in an example. The force detection device may include a substrate and a force transmission block. The substrate is preferably made of a material exerting a piezoresistive effect by which electric resistance varies with compressive stress. Examples of the substrate include but not limited to a semiconductor substrate and an SOI substrate. The substrate has a mesa gauge, a connection region, and a sealing portion. The mesa gauge is provided to a principal plane of the substrate and forms a bridge circuit. The connection region is provided to the principal plane of the substrate and doped with an impurity. The sealing portion is provided to the principal plane of the substrate to surround all around the mesa gauge and joined to the force transmission block. The mesa gauge has a first mesa gauge and a second mesa gauge. The first mesa gauge extends in a first direction. The second mesa gauge extends in a second direction different from the first direction and is apart from the first mesa gauge. The connection region is disposed between one end of the first mesa gauge and one end of the second mesa gauge and electrically connects the one end of the first mesa gauge and the one end of the second mesa gauge.

In the force detection device disclosed herein, the substrate may further have a wiring provided to the principal plane of the substrate and doped with an impurity. The connection region may include a narrow portion narrowed between the one end of the first mesa gauge and the one end of the second mesa gauge. The wiring is connected to the narrow portion. For example, in the case of a connection region without the narrow portion, a current flowing through the connection region takes a different path due to production tolerance. Such inconsistency in current paths causes deterioration of zero-point offset characteristics. On the contrary, in the case of the connection region including the narrow portion, a path of a current flowing through the connection region can be restricted. Consequently, deterioration of zero-point offset characteristics in the force detection device can be reduced.

In the force detection device disclosed herein, the first direction of the substrate may be a direction in which a variance in electric resistance value with stress is relatively large, and the second direction of the substrate may be a direction which is orthogonal to the first direction and in which a variance in electrical resistance value with stress is relatively small. The first mesa gauge may have a first high-sensitive mesa gauge and a second high-sensitive mesa gauge. The second mesa gauge may have a first low-sensitive mesa gauge and a second low-sensitive mesa gauge. The first high-sensitive mesa gauge and the second high-sensitive mesa gauge may be disposed point-symmetric with respect to a center point of an inner region inside the sealing portion. According to the configuration as above, a force is transmitted equally to the first high-sensitive mesa gauge and the second high-sensitive mesa gauge in response to a force applied to the force transmission block. Hence, linearity of an output in response to a force applied to the force transmission block can be enhanced.

In the force detection device disclosed herein, the inner region may be of a rectangular shape. The inner region may have a set of opposing sides extending in the first direction and another set of opposing sides extending in the second direction. The first high-sensitive mesa gauge and the second high-sensitive mesa gauge may be disposed at positions at which the inner region is divided into three equal segments in the second direction in a center of the inner region in the first direction. According to the configuration as above, a force applied to the force transmission block is transmitted to the first high-sensitive mesa gauge and the second high-sensitive mesa gauge in a perpendicular direction. Hence, the first high-sensitive mesa gauge and the second high-sensitive mesa gauge can be restricted from being compressed diagonally. Consequently, linearity of an output in response to a force applied to the force transmission block can be enhanced further.

First Example

As is shown in FIG. 1, a force detection device 1 is, for example, a semiconductor pressure sensor detecting a vessel internal pressure of a pressure vessel, and includes a semiconductor substrate 2 and a force transmission block 4.

Figure 2:
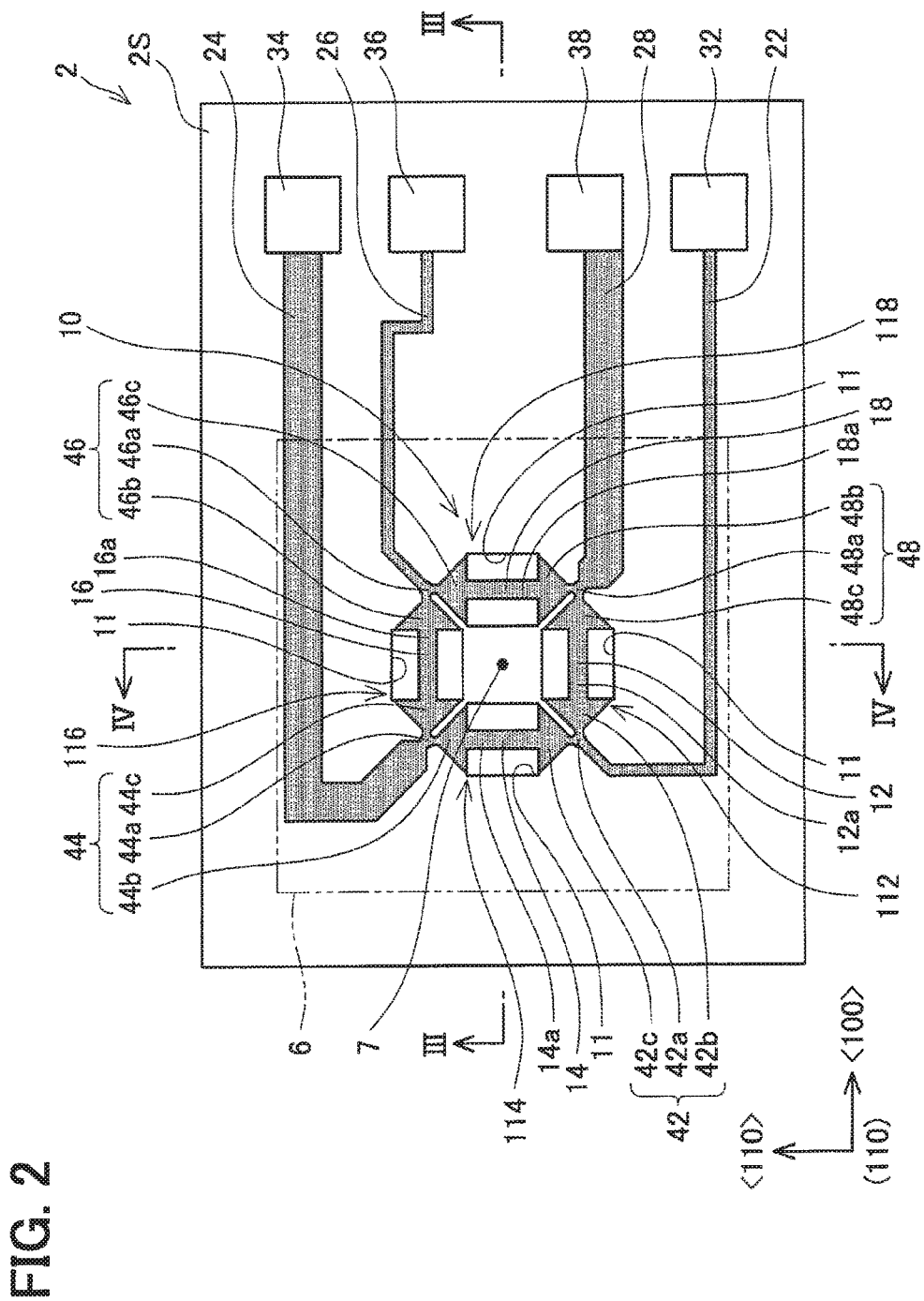
FIG. 2 is a top view schematically showing the semiconductor substrate included in the force detection device of the example to indicate the range of the sealing space defined by the semiconductor substrate and the force transmission block by an alternate long and two short dashes line.

As are shown in FIGS. 1 and 2, the semiconductor substrate 2 is n-type single-crystal silicon and a principal plane 2S is a (110) crystal plane. Multiple grooves 11 are provided to the principal plane 2S of the semiconductor substrate 2. The multiple grooves 11 are provided in a detection portion 10 on the principal plane 2S of the semiconductor substrate 2. Multiple mesa gauges 12, 14, 16, and 18 are defined in the detection portion 10.

As are shown in FIGS. 1, 2, 3, and 4, the mesa gauges 12, 14, 16, and 18 protrude from bottom surfaces of the grooves 11 while forming a mesa shape to a height of about 0.5 to 5 µm. Top surfaces of the respective mesa gauges 12, 14, 16, and 18 are flush with the principal plane 2S of the semiconductor substrate 2 on a periphery of the grooves 11. That is, the mesa gauges 12, 14, 16, and 18 are provided as a remaining portion of the principal plane 2S of the semiconductor substrate 2 after the multiple grooves 11 are provided by, for example, a dry etching technique.

As are shown in FIGS. 1 and 2, the mesa gauges 12, 14, 16, and 18 in the detection portion 10 are disposed correspondingly to sides of a square. However, the mesa gauges 12, 14, 16, and 18 are disposed in such a manner that ends of any one of the mesa gauges 12, 14, 16, and 18 are spaced apart from ends of the other mesa gauges. The mesa gauges 14 and 18 forming one pair of opposing sides are referred to as the first high-sensitive mesa gauge 14 and the second high-sensitive mesa gauge 18, respectively. The mesa gauges 12 and 16 forming the other pair of opposing sides are referred to as the first low-sensitive mesa gauge 12 and the second low-sensitive mesa gauge 16, respectively.

The first high-sensitive mesa gauge 14 and the second high-sensitive mesa gauge 18 extend along a <110>-direction of the semiconductor substrate 2. The first high-sensitive mesa gauge 14 and the second high-sensitive mesa gauge 18 extending in the <110>-direction of the semiconductor substrate 2 are characterized in that an electric resistance value varies considerably with compressive stress, and have a piezoresistive effect. The <110>-direction of the semiconductor substrate 2 corresponds to an example of "a first direction".

The first low-sensitive mesa gauge 12 and the second low-sensitive mesa gauge 16 extend along a <100>-direction of the semiconductor substrate 2 orthogonal to the <110>-direction of the semiconductor substrate 2. The first low-sensitive mesa gauge 12 and the second low-sensitive mesa gauge 16 extending in the <100>-direction of the semiconductor substrate 2 are characterized in that an electric resistance value hardly varies with compressive stress, and have substantially no piezoresistive effect. The <100>-direction of the semiconductor substrate 2 corresponds to an example of "a second direction".

As are shown in FIGS. 1, 2, 3, and 4, gauge portions 12a, 14a, 16a, and 18a doped with a p-type impurity are provided to surfaces of the mesa gauges 12, 14, 16, and 18, respectively. Impurity concentration of the gauge portions 12a, 14a, 16a, and 18a is about $1\times10^{18}$ to $1\times10^{21}$ cm$^{-3}$. The impurity concentration and diffusion depths of the gauge portions 12a, 14a, 16a, and 18a are same in all the mesa gauges 12, 14, 16, and 18. The respective gauge portions 12a, 14a, 16a, and 18a are substantially insulated from the n-type semiconductor substrate 2 by a p-n junction.

A width and a length are same in all the mesa gauges 12, 14, 16, and 18. Hence, resistance values of the gauge portions 12a, 14a, 16a, and 18a of the mesa gauges 12, 14, 16, and 18, respectively, are equal. Herein, a width of the mesa gauges 12, 14, 16, and 18 means a width in a direction orthogonal to a longitudinal direction. In the present example, a width of the high-sensitive mesa gauges 14 and 18 is a width in the <100>-direction of the semiconductor substrate 2, and a width of the low-sensitive mesa gauges 12 and 16 is a width in the <110>-direction of the semiconductor substrate 2. The high-sensitive mesa gauges 14 and 18 are line-symmetric with respect to a straight line (not shown) linking midpoints of the respective low-sensitive mesa gauges 12 and 16. The low-sensitive mesa gauges 12 and 16 are line-symmetric with respect to a straight line (not shown) linking midpoints of the respective high-sensitive mesa gauges 14 and 18.

As are shown in FIGS. 1 and 2, the semiconductor substrate 2 has connection regions 42, 44, 46, and 48 doped with a p-type impurity on the principal plane 2S. Impurity concentration of the connection regions 42, 44, 46, and 48 is about $1\times10^{18}$ to $1\times10^{21}$ cm$^{-3}$. The connection regions 42, 44, 46, and 48 are formed in a same process in which the gauge portions 12a, 14a, 16a, and 18a of the mesa gauges 12, 14, 16, and 18, respectively, are formed.

The first connection region 42 is disposed between one end of the first low-sensitive mesa gauge 12 and one end of the first high-sensitive mesa gauge 14. The first connection region 42 includes a narrow portion 42a narrowed considerably, and a portion 42b and a portion 42c, which are two portions divided by being narrowed partially. The portion 42b and the portion 42c account for a large proportion of the first connection region 42 and the narrow portion 42a accounts for an extremely small proportion. The portion 42b and the portion 42c are connected via the narrow portion 42a. The portion 42b and the portion 42c are formed to have equal resistance values. One end of the gauge portion 12a of the first low-sensitive mesa gauge 12 is electrically connected to the portion 42b and one end of the gauge portion 14a of the first high-sensitive mesa gauge 14 is electrically connected to the portion 42c. In short, the first connection region 42 electrically connects the one end of the gauge portion 12a and the one end of the gauge portion 14a.

The second connection region 44 is disposed between the other end of the first high-sensitive mesa gauge 14 and one end of the second low-sensitive mesa gauge 16. The second connection region 44 includes a narrow portion 44a narrowed considerably, and a portion 44b and a portion 44c, which are two portions divided by being narrowed partially. A configuration of the narrow portion 44a, the portion 44b, and the portion 44c is same as the configuration of the narrow portion 42a, the portion 42b, and the portion 42c of the first connection region 42. The other end of the gauge portion 14a of the first high-sensitive mesa gauge 14 is electrically connected to the portion 44b and one end of the gauge portion 16a of the second low-sensitive mesa gauge 16 is electrically connected to the portion 44c. In short, the second connection region 44 electrically connects the other end of the gauge portion 14a and the one end of the gauge portion 16a.

The third connection region 46 is disposed between the other end of the second low-sensitive mesa gauge 16 and one end of the second high-sensitive mesa-gauge 18. The third connection region 46 includes a narrow portion 46a narrowed considerably, and a portion 46b and a portion 46c, which are two portions divided by being narrowed partially. A configuration of the narrow portion 46a, the portion 46b, and the portion 46c is same as the configuration of the narrow portion 42a, the portion 42b, and the portion 42c of the first connection region 42. The other end of the gauge portion 16a of the second low-sensitive mesa gauge 16 is electrically connected to the portion 46b, and one end of the gauge portion 18a of the second high-sensitive mesa gauge 18 is electrically connected to the portion 46c. In short, the third connection region 46 electrically connects the other end of the gauge portion 16a and the one end of the gauge portion 18a.

The fourth connection region 48 is disposed between the other end of the second high-sensitive mesa gauge 18 and the other end of the first low-sensitive mesa gauge 12. The fourth connection region 48 includes a narrow portion 48a narrowed considerably, and a portion 48b and a portion 48c, which are two portions divided by being narrowed partially. A configuration of the narrow portion 48a, the portion 48b, and the portion 48c is same as the configuration of the narrow portion 42a, the portion 42b, and the portion 42c of the first connection region 42. The other end of the gauge portion 18a of the second high-sensitive mesa gauge 18 is electrically connected to the portion 48b and the other end of the gauge portion 12a of the first low-sensitive mesa gauge 12 is electrically connected to the portion 48c. In short, the fourth connection region 48 electrically connects the other end of the gauge portion 18a and the other end of the gauge portion 12a.

A single first resistor 112 is formed of the gauge portion 12a of the first low-sensitive mesa gauge 12, and the portion 42b of the first connection region 42 and the portion 48c of the fourth connection region 48 connected in series, respectively, to the one end and the other end of the gauge portion 12a. The portion 42b of the first connection portion 42 and the portion 48c of the fourth connection region 48 are formed wide and therefore have extremely small resistance values. A resistance value of the first resistor 112 thus chiefly depends on a resistance value of the gauge portion 12a of the first low-sensitive mesa gauge 12.

A single second resistor 114 is formed of the gauge portion 14a of the first high-sensitive mesa gauge 14, and the portion 42c of the first connection region 42 and the portion 44b of the second connection region 44 connected in series, respectively, to the one end and the other end of the gauge portion 14a. The portion 42c of the first connection region 42 and the portion 44b of the second connection region 44 are formed wide and therefore have extremely small resistance values. A resistance value of the second resistor 114 thus chiefly depends on a resistance value of the gauge portion 14a of the first high-sensitive mesa gauge 14.

A single third resistor 116 is formed of the gauge portion 16a of the second low-sensitive mesa gauge 16, and the portion 44c of the second connection region 44 and the portion 46b of the third connection region 46 connected in series, respectively, to the one end and the other end of the gauge portion 16a. The portion 44c of the second connection region 44 and the portion 46b of the third connection portion 46 are formed wide and therefore have extremely small resistance values. A resistance value of the third resistor 116 thus chiefly depends on a resistance value of the gauge portion 16a of the second low-sensitive mesa gauge 16.

A single fourth resistor 118 is formed of the gauge portion 18a of the second high-sensitive mesa gauge 18, and the portion 46c of the third connection region 46 and the portion 48b of the fourth connection region 48 connected in series, respectively, to the one end and the other end of the gauge portion 18a. The portion 46c of the third connection region 46 and the portion 48b of the fourth connection region 48 are formed wide and therefore have extremely small resistance values. A resistance value of the fourth resistor 118 thus chiefly depends on a resistance value of the gauge portion 18a of the second high-sensitive mesa gauge 18. Resistance values of the respective resistors 112, 114, 116, and 118 are equal.

As are shown in FIGS. 1 and 2, the semiconductor substrate 2 has wirings 22, 24, 26, and 28 doped with a p-type impurity on the principal plane 2S. Impurity concentration of the wirings 22, 24, 26, and 28 is about $1 \times 10^{18}$ to $1 \times 10^{21}$ cm$^{-3}$. The wirings 22, 24, 26, and 28 are formed in a same process in which the gauge portions 12a, 14a, 16a, and 18a of the mesa gauges 12, 14, 16, and 18, respectively, are formed.

The mesa gauges 12, 14, 16, and 18 form a full-bridge circuit in the detection portion 10. The power-supply wiring 28 is connected to the narrow portion 48a of the fourth connection region 48. The reference wiring 24 is connected to the narrow portion 44a of the second connection region 44. The first resistor 112 and the second register 114 are connected in series via the narrow portion 42a of the first connection region 42 between the power-supply wiring 28 and the reference wiring 24. The fourth resistor 118 and the third resistor 116 are connected in series via the narrow portion 46a of the third connection region 46 between the power-supply wiring 28 and the reference wiring 24. A set of the first resistor 112 and the second resistor 114 and a set of the fourth resistor 118 and the third resistor 116 are connected in parallel between the power-supply wiring 28 and the reference wiring 24.

The first output wiring 26 is connected to the narrow portion 46a of the third connection region 46 between the fourth resistor 118 and the third resistor 116. The second output wiring 22 is connected to the narrow portion 42a of the first connection region 42 between the first resistor 112 and the second resistor 114.

The reference wiring 24 is electrically connected to a reference electrode 34. The first output wiring 26 is electrically connected to a first output electrode 36. The power-supply wiring 28 is electrically connected to a power-supply electrode 38. The second output wiring 22 is electrically connected to a second output electrode 32. The electrodes 32, 34, 36, and 38 are provided on the principal plane 2S of the semiconductor substrate 2 outside a region covered with the force transmission block 4. The reference wiring 24 and the power-supply wiring 28 are formed wide and therefore have negligibly small resistance values in comparison with resistance values of the resistors 112, 114, 116, and 118. The first output wiring 26 and the second output wiring 22 are formed to have equal resistance values.

Figure 3:
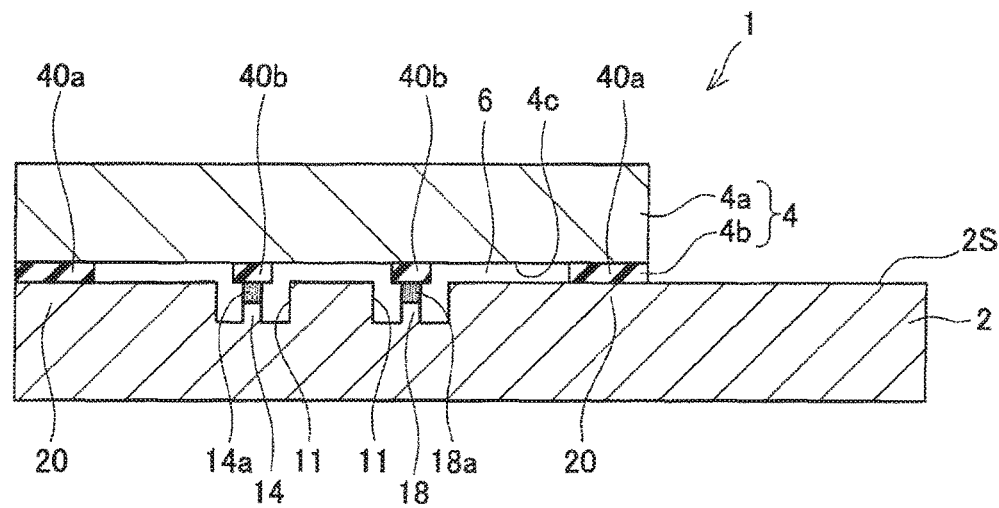
FIG. 3 is a schematic sectional view taken along the line III-III of FIG. 2.
Figure 4:
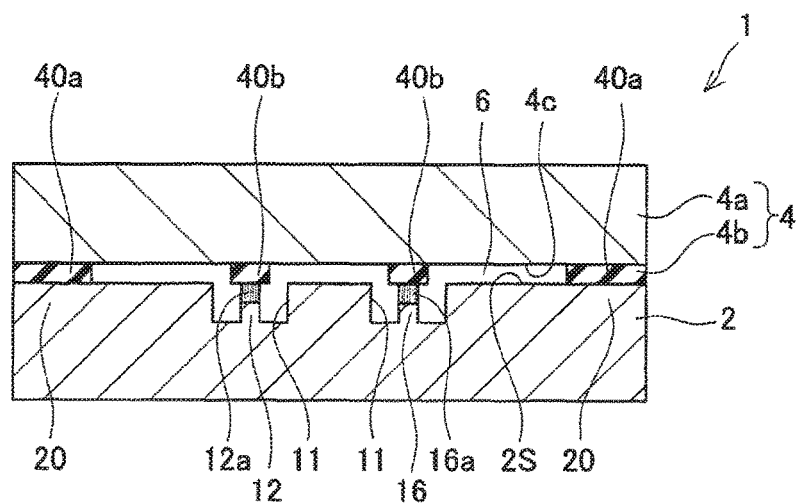
FIG. 4 is a schematic sectional view taken along the line IV-IV of FIG. 2.

As are shown in FIGS. 1, 3, and 4, the force transmission block 4 is of a rectangular prism shape and has a silicon layer 4a and an oxide silicon layer 4b. The semiconductor substrate 2 and the force transmission block 4 are joined by exploiting a cold solid-state welding technique. More specifically, the principal plane 2S of the semiconductor 2 and the oxide silicon layer 4b of the force transmission block 4 are joined by activating surfaces of the principal plane 2S of the semiconductor 2 and the oxide silicon layer 4b of the force transmission block 4 using argon ion and bringing the activated surfaces into contact with each other in an ultra-high vacuum.

Figure 5:
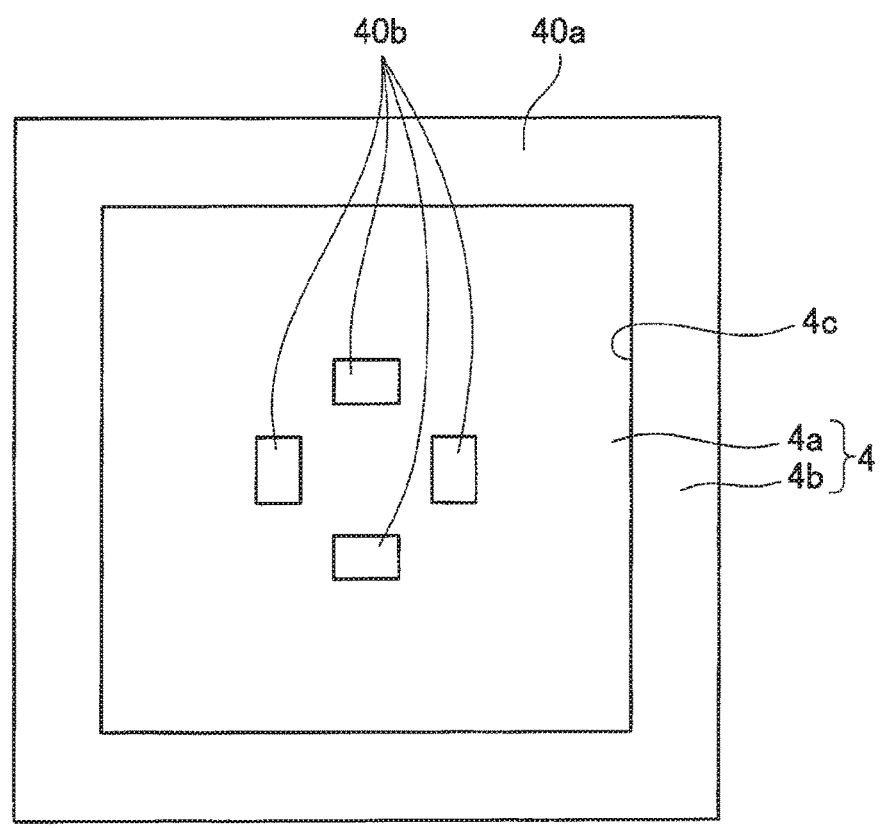
FIG. 5 is a view of the force transmission block included in the force detection device of the example to schematically show a surface to which the semiconductor substrate is joined.

As are shown in FIGS. 3, 4, and 5, a part of the oxide silicon layer 4b of the force transmission block 4 is removed and a groove 4c is provided to the force transmission block 4 in a surface joined to the semiconductor substrate 2. By providing the groove 4c, the oxide silicon layer 4b of the force transmission block 4 is divided to a sealing portion 40a and a pressing portion 40b. Also, by providing the groove 4c as above, a sealing space 6 separated from an exterior is defined between the semiconductor substrate 2 and the force transmission block 4.

The sealing portion 40a of the force transmission block 4 is joined to the principal plane 2S of the semiconductor 2 to surround all around the mesa gauges 12, 14, 16, and 18. A portion of the semiconductor substrate 2 to which is joined the sealing portion 40a of the force transmission block 4 is referred to as a sealing portion 20. The sealing portion 40a of the force transmission block 4 is formed in a rectangular shape. Accordingly, the sealing portion 20 of the semiconductor substrate 2 includes a section parallel to the longitudinal direction of the high-sensitive mesa gauges 14 and 18 and a section parallel to the longitudinal direction of the low-sensitive mesa gauges 12 and 16. An inner region of the sealing portion 20 on the principal plane 2S of the semiconductor substrate 2 is of a square shape. A set of opposing sides of the inner region of the sealing portion 20 extends in the <110>-direction of the semiconductor substrate 2 and another set of opposing sides extend in the <100>-direction of the semiconductor substrate 2. The sealing portion 20 of the semiconductor substrate 2 and the sealing portion 40a of the force transmission block 4 are joined hermetically.

As are shown in FIGS. 1 and 2, the high-sensitive mesa gauges 14 and 18 are disposed at positions at which the sealing space 6 is divided into three equal segments in the <100>-direction of the semiconductor substrate 2 (that is, positions at which the inner region of the sealing portion 20 is divided into three equal segments). The low-sensitive mesa gauges 12 and 16 are disposed at positions at which the sealing space 6 is divided into three equal segments in the <110>-direction of the semiconductor substrate 2 (that is, positions at which the inner region of the sealing portion 20 is divided into three equal segments).

The pressing portion 40b of the force transmission block 4 is joined to the top surfaces of the respective mesa gauges 12, 14, 16, and 18. Contact areas between the pressing portion 40b and the top surfaces of the respective high-sensitive mesa gauges 14 and 18 are equal. Contact areas between the pressing portion 40b and the top surfaces of the respective low-sensitive mesa gauges 12 and 16 are equal.

An operation of the force detection device 1 will now be described. When the force detection device 1 is in use, a constant current supply is connected to the power-supply electrode 38 while the reference electrode 34 is grounded and a voltage measuring instrument is connected between the first output electrode 36 and the second output electrode 32. In the force detection device 1, when a vessel internal pressure applied to the force transmission block 4 varies, compressive stress applied to the gauge portions 12a, 14a, 16a, and 18a of the mesa gauges 12, 14, 16, and 18, respectively, via the force transmission block 4 varies, too. Electric resistance values of the gauge portions 14a and 18a, respectively, of the high-sensitive mesa gauges 14 and 18 exerting the piezoresistive effect vary in proportion to compressive stress. Hence, a potential difference between the first output electrode 36 and the second output electrode 32 is proportional to compressive stress applied to the gauge portions 14a and 18a. A vessel internal pressure applied to the force transmission block 4 is thus detected from a variance in voltage measured by the voltage measuring instrument.

The force detection device 1 has a sealing structure by which the detection portion 10 of the semiconductor substrate 2 is sealed by the force transmission block 4. In the force detection device 1, the ends of any one of the mesa gauges 12, 14, 16, and 18 forming the bridge circuit are not directly connected to the ends of the other mesa gauges and the connection regions 42, 44, 46, and 48 are disposed between the ends of two mesa gauges. Two mesa gauges sandwiching each of the connection regions 42, 44, 46, and 48 are electrically connected via one of the connection regions 42, 44, 46, and 48 sandwiched in between. Hence, lengths of the mesa gauges 12, 14, 16, and 18 can be adjusted by expanding or reducing ranges within which the connection regions 42, 44, 46, and 48 are provided. For example, by expanding the ranges within which the connection regions 42, 44, 46, and 48 are provided, the mesa gauges 12, 14, 16, and 18 can be shorter and contact areas between the pressing portion 40b of the force transmission block 4 and the respective high-sensitive mesa gauges 14 and 18 can be reduced. Consequently, a vessel internal pressure applied to the force transmission block 4 is effectively transmitted to the high-sensitive mesa gauges 14 and 18. Sensor sensitivity of the force detection device 1 can be thus enhanced. Hence, in the force detection device 1 having the sealing structure and including the mesa gauges 12, 14, 16, and 18 which form a bridge circuit, the mesa gauges 12, 14, 16, and 18 can be designed more flexibly to adjust sensitivity.

As has been described, because the force detection device 1 has the sealing structure, compressive stress applied to the high-sensitive mesa gauges 14 and 18 depends on positions of the high-sensitive mesa gauges 14 and 18 in the sealing space 6. In the present example, as is shown in FIG. 2, the high-sensitive mesa gauges 14 and 18 are disposed side by side in the <100>-direction of the semiconductor substrate 2. Hence, compressive stress applied to the high-sensitive mesa gauges 14 and 18 depends on positions of the high-sensitive mesa gauges 14 and 18 in the sealing space 6 in the <100>-direction of the semiconductor substrate 2.

In the force detection device 1, the first high-sensitive mesa gauge 14 and the second high-sensitive mesa gauge 18 are disposed point-symmetric with respect to a center point 7 (see FIGS. 1 and 2) in the inner region of the sealing portion 20. More specifically, in the <100>-direction of the semiconductor substrate 2, a shortest distance between the first high-sensitive mesa gauge 14 and the sealing portion 20 of the semiconductor substrate 2 (the section of the sealing portion 20 parallel to the longitudinal direction of the first high-sensitive mesa gauge 14, which corresponds to an edge of the sealing space 6 on a left side in a sheet surface of FIG. 2) is equal to a shortest distance between the second high-sensitive mesa gauge 18 and the sealing portion 20 of the semiconductor substrate 2 (the section of the sealing portion 20 parallel to the longitudinal direction of the second high-sensitive mesa gauge 18, which corresponds to an edge of the sealing space 6 on a right side in the sheet surface of FIG. 2). A force is thus transmitted equally to the first high-sensitive mesa gauge 14 and the second high-sensitive mesa gauge 18 in response to a force applied to the force transmission block 4. Consequently, linearity of an output in response to a force applied to the force transmission block 4 can be enhanced.

In the force detection device 1, the high-sensitive mesa gauges 14 and 18 are disposed at positions at which the sealing space 6 is divided into three equal segments in the <100>-direction of the semiconductor substrate 2 in a center of the sealing space 6 in the <110>-direction of the semiconductor substrate 2. Owing to such a configuration, a force applied to the force transmission block 4 is transmitted to the top surfaces of the high-sensitive mesa gauges 14 and 18 in a perpendicular direction. Hence, the high-sensitive mesa gauges 14 and 18 can be restricted from being diagonally compressed. Consequently, linearity of an output in response to a force applied to the force transmission block 4 can be enhanced further.

In the force detection device 1, the connection regions 42, 44, 46, and 48 have the narrow portions 42a, 44a, 46a, and 48a, respectively, and the wirings 22, 24, 26, and 28 are connected to the narrow portions 42a, 44a, 46a, and 48a, respectively. The narrow portions 42a, 44a, 46a, and 48a account for an extremely small proportion of the connection regions 42, 44, 46, and 48, respectively. For example, in the case of connection regions without the narrow portions 42a, 44a, 46a, and 48a, a current flowing through the connection regions takes a different path due to production tolerance. Such inconsistency in current paths causes deterioration of zero-point offset characteristics. On the contrary, in the case of the connection regions 42, 44, 46, and 48 including the narrow portions 42a, 44a, 46a, and 48a, respectively, paths of a current flowing through the connection regions 42, 44, 46, and 48 can be restricted. Consequently, deterioration of zero-point offset characteristics in the force detection device 1 can be reduced.

In the force detection device 1, the connection regions 42, 44, 46, and 48 are formed in such a manner that two portions divided by being narrowed partially (the portion 42b and the portion 42c, the portion 44b and the portion 44c, the portion 46b and the portion 46c, and the portion 48b and the portion 48c) have equal resistance values. Accordingly, resistance values of the respective resistors 112, 114, 116, and 118 become equal. Consequently, an offset voltage can be reduced in the force detection device 1.

Second Example

One embodiment of a force detection device disclosed herein is a sensor detecting various pressures, and a detection target may be an air pressure or a fluid pressure in an example. The force detection device may include a substrate and a force transmission block. The substrate is preferably made of a material exerting a piezoresistive effect by which electric resistance varies with compressive stress. Examples of the substrate include but not limited to a semiconductor substrate and an SOI substrate. The force detection device includes a mesa gauge. In the force detection device, a detection portion may be formed of one mesa gauge or multiple mesa gauges. The force detection device has a fixed resistor connected in parallel to the mesa gauge, and configured to detect a force by exploiting a variance in combined resistance value of the mesa gauge and the fixed resistor.

In the force detection device disclosed herein, an electric resistance value of the fixed resistor may be greater than an initial electric resistance value of the mesa gauge under no stress. According to the configuration as above, a decreasing rate of sensitivity of the force detection device when the fixed resistor is connected in parallel to the mesa gauge can be reduced. The term, "sensitivity", referred to herein means a ratio of an increased amount of an electric resistance value under stress to an electric resistance value under no stress.

In the force detection device disclosed herein, the mesa gauge may be provided to a principal plane of the semiconductor substrate in a stepped-mesa shape and the fixed resistor may be provided to the principal plane of the semiconductor substrate in a stepped-mesa shape. According to the configuration as above, the fixed resistor can be manufactured in a same process in which the mesa gauge is manufactured.

The force detection device disclosed herein may further include a force transmission block. The force transmission block may be provided to be in contact with a top surface of the mesa gauge and out of contact with a top surface of the fixed resistor. According to the configuration as above, because no stress is applied to the fixed resistor, an electric resistance value of the fixed resistor can be maintained constant.

In the force detection device disclosed herein, the mesa gauge may extend linearly along one direction and the fixed resistor may include a portion that extends and folds back along the one direction. A relationship that an electric resistance value of the fixed resistor is greater than an initial electric resistance value of the mesa gauge can be obtained while consuming a less area of the substrate.

As is shown in FIG. 5, a force detection device 2001 is, for example, a semiconductor pressure sensor detecting a vessel internal pressure of a pressure vessel, and includes a semiconductor substrate 2002 and a force transmission block 2004.

Figure 7:
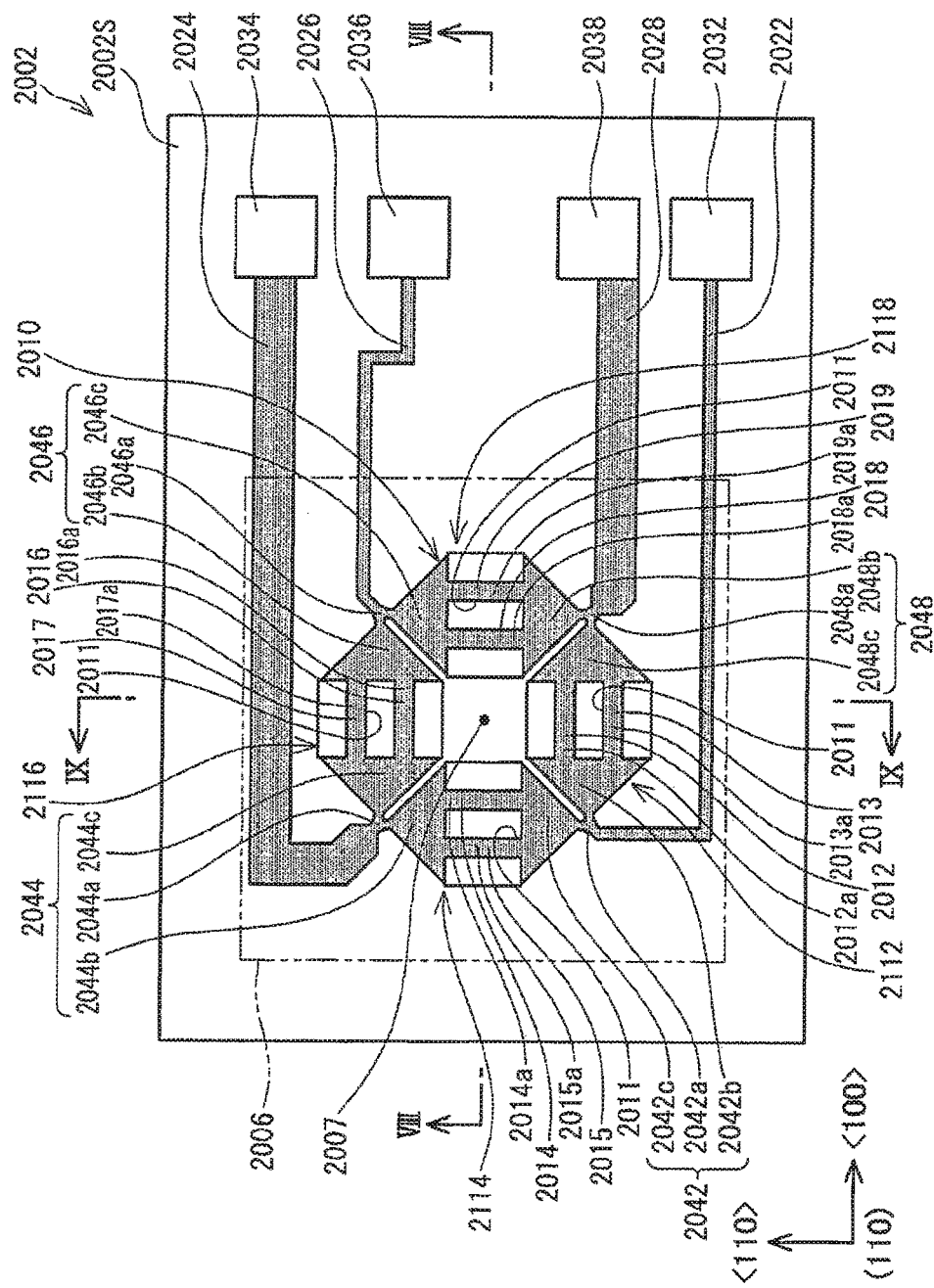
FIG. 7 is a top view schematically showing the semiconductor substrate included in the force detection device of the second example to indicate the range of the sealing space defined by the semiconductor substrate and the force transmission block by an alternate long and two short dashes line.

As are shown in FIGS. 5 and 7, the semiconductor substrate 2002 is n-type single-crystal silicon and a principal plane 2002S is a (110) crystal plane. Multiple grooves 2011 are provided to the principal plane 2S of the semiconductor substrate 2002. The multiple grooves 2011 are provided in a detection portion 2010 on the principal plane 2002S of the semiconductor substrate 2002. Multiple mesa gauges 2012, 2014, 2016, and 2018 and multiple fixed resistors 2013, 2015, 2017, and 2019 are defined in the detection portion 2010.

As are shown in FIGS. 6, 7, 8, and 9, the mesa gauges 2012, 2014, 2016, and 2018 and the fixed resistors 2013, 2015, 2017, and 2019 are provided to the principal plane 2002S of the semiconductor substrate 2002 in a stepped-mesa shape. More specifically, the mesa gauges 2012, 2014, 2016, and 2018 and the fixed resistors 2013, 2015, 2017, and 2019 protrude from bottom surfaces of the grooves 2011 while forming a mesa shape to a height of about 0.5 to 5 μm. Top surfaces of the mesa gauges 2012, 2014, 2016, and 2018 and top surfaces of the fixed resistors 2013, 2015, 2017, and 2019 are flush with the principal plane 2002S of the semiconductor substrate 2002 on a periphery of the grooves 2011. That is, the mesa gauges 2012, 2014, 2016, and 2018 and the fixed resistors 2013, 2015, 2017, and 2019 are provided as a remaining portion of the principal plane 2002S of the semiconductor substrate 2002 after the multiple grooves 2011 are provided by, for example, a dry etching technique.

Figure 6:
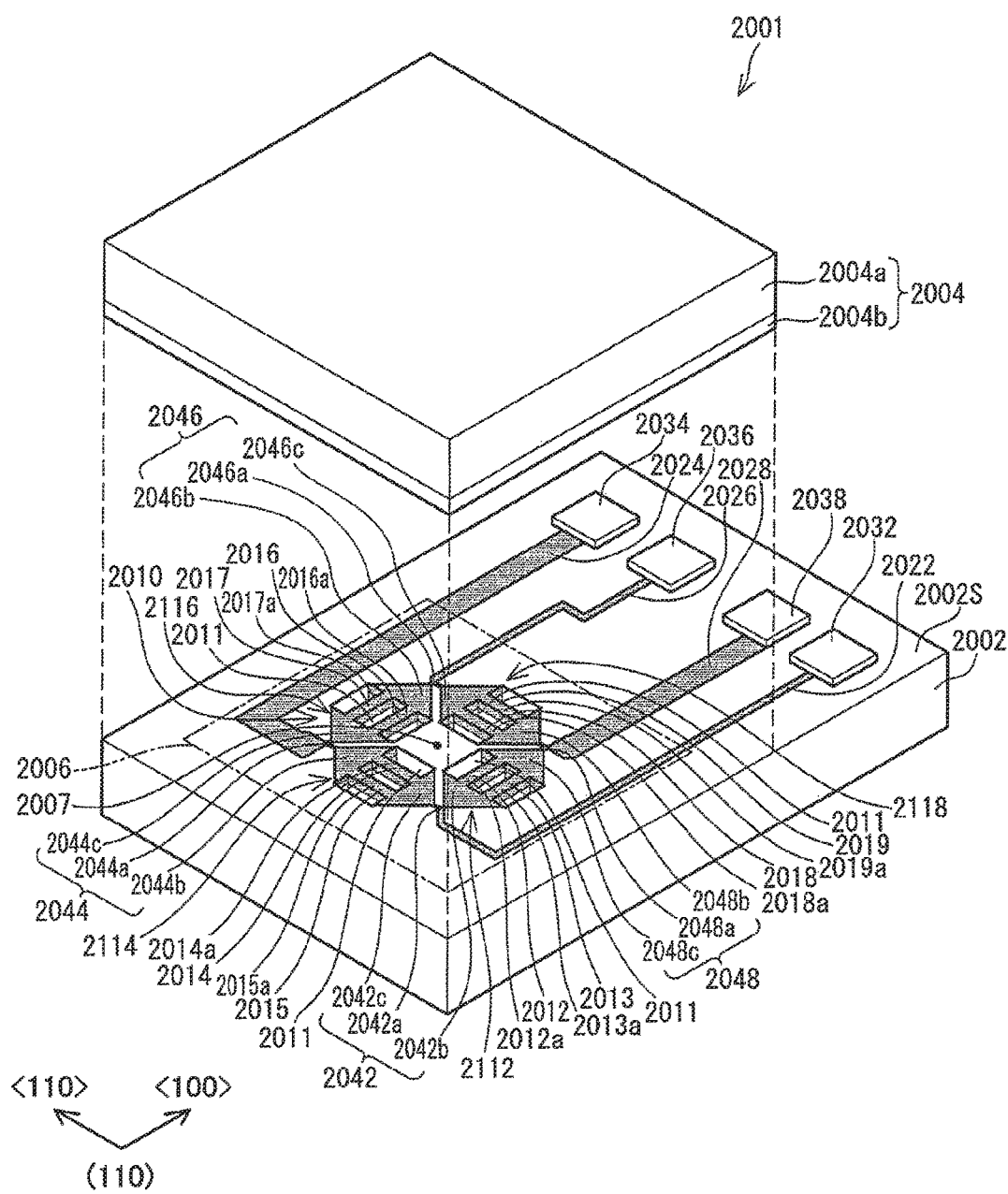
FIG. 6 is an exploded perspective view schematically showing a force detection device of a second example to indicate a range of a sealing space defined by a semiconductor substrate and a force transmission block by an alternate long and two short dashes line.

As are shown in FIGS. 6 and 7, the mesa gauges 2012, 2014, 2016, and 2018 in the detection portion 2010 are disposed correspondingly to sides of a square. However, the mesa gauges 2012, 2014, 2016, and 2018 are disposed in such a manner that ends of any one of the mesa gauges 2012, 2014, 2016, and 2018 are apart from ends of the other mesa gauges. The mesa gauges 2014 and 2018 forming one pair of opposing sides are referred to as the first high-sensitive mesa gauge 2014 and the second high-sensitive mesa gauge 2018, respectively. The mesa gauges 2012 and 2016 forming the other pair of opposing sides are referred to as the first low-sensitive mesa gauge 2012 and the second low-sensitive mesa gauge 2016, respectively.

The first high-sensitive mesa gauge 2014 and the second high-sensitive mesa gauge 2018 extend along a <110>-direction of the semiconductor substrate 2002. The first high-sensitive mesa gauge 2014 and the second high-sensitive mesa gauge 2018 extending in the <110>-direction of the semiconductor substrate 2002 are characterized in that an electric resistance value varies considerably with compressive stress, and have a piezoresistive effect.

The first low-sensitive mesa gauge 2012 and the second low-sensitive mesa gauge 2016 extend along a <100>-direction of the semiconductor substrate 2002 orthogonal to the <110>-direction of the semiconductor substrate 2002. The first low-sensitive mesa gauge 2012 and the second low-sensitive mesa gauge 2016 extending in the <100>-direction of the semiconductor substrate 2002 are characterized in that an electric resistance value hardly varies with compressive stress, and have substantially no piezoresistive effect.

As are shown in FIGS. 6 and 7, the fixed resistors 2013, 2015, 2017, and 2019 are disposed on an outer side of the mesa gauges 2012, 2014, 2016, and 2018 (that is, on the sides of the respective mesa gauges 2012, 2014, 2016, and 2018 opposite to a center of the detection portion 2010). The fixed resistors 2015 and 2019 extend along the <110>-direction of the semiconductor substrate 2002. The fixed resistors 2013 and 2017 extend along the <100>-direction of the semiconductor substrate 2002.

As are shown in FIGS. 6, 7, 8 and 9, gauge portions 2012a, 2014a, 2016a, and 2018a doped with a p-type impurity are provided to surfaces of the mesa gauges 2012, 2014, 2016, and 2018, respectively. Impurity concentration of the gauge portions 2012a, 2014a, 2016a, and 2018a is about $1 \times 10^{18}$ to $1 \times 10^{21}$ cm$^{-3}$. Impurity concentration and diffusion depths of the gauge portions 2012a, 2014a, 2016a, and 2018a are same in all the mesa gauges 2012, 2014, 2016, and 2018. The gauge portions 2012a, 2014a, 2016a, and 2018a are substantially insulated from the n-type semiconductor 2002 by a p-n junction.

As are shown in FIGS. 6, 7, 8, and 9, gauge portions 2013a, 2015a, 2017a, and 2019a doped with a p-type impurity are provided to surfaces of the fixed resistors 2103, 2015, 2017, and 2019, respectively. Impurity concentration of the gauge portions 2013a, 2015a, 2017a, and 2019a is about $1 \times 10^{18}$ to $1 \times 10^{21}$ cm$^{-3}$. Impurity concentration and diffusion depths of the gauge portions 2013a, 2015a, 2017a, and 2019a are same in all the fixed resistors 2013, 2015, 2017, and 2019. Impurity concentration and diffusion depths of the gauge portions 2013a, 2015a, 2017a, and 2019a are also same as the impurity concentration and the diffusion depths of the gauge portions 2012a, 2014a, 2016a, and 2018a of the mesa gauges 2012, 2014, 2016, and 2018, respectively. The gauge portions 2013a, 2015a, 2017a, and 2019a are substantially insulated from the n-type semiconductor substrate 2002 by a p-n junction. The gauge portions 2013a, 2015a, 2017a, and 2019a of the fixed resistors 2013, 2015, 2017, and 2019, respectively, are formed in a same process in which the gauge portions 2012a, 2014a, 2016a, and 2018a of the mesa gauges 2012, 2014, 2016, and 2018, respectively, are formed.

A width and a length are same in all the mesa gauges 2012, 2014, 2016, and 2018. Hence, electric resistance values (to be more exact, initial resistance values before compressive stress is applied) of the gauge portions 2012a, 2014a, 2016a, and 2018a of the mesa gauges 2012, 2014, 2016, and 2018, respectively, are equal. A width of the mesa gauges 2012, 2014, 2016, and 2018 means a width in a direction orthogonal to a longitudinal direction. In the present example, a width of the high-sensitive mesa gauges 2014 and 2018 is a width in the <100>-direction of the semiconductor substrate 2002 and a width of the low-sensitive mesa gauges 2012 and 2016 is a width in the <110>-direction of the semiconductor substrate 2002. The high-sensitive mesa gauges 2014 and 2018 are line-symmetric with respect to a straight line (not shown) linking midpoints of the respective low-sensitive mesa gauges 2012 and 2016. The low-sensitive mesa gauges 2012 and 2016 are line-symmetric with respect to a straight line (not shown) linking midpoints of the respective high-sensitive mesa gauges 2014 and 2018.

A width and a length are same in all the fixed resistors 2013, 2015, 2017, and 2019. Hence, electric resistance values of the gauge portions 2013a, 2015a, 2017a, and 2019a of the fixed resistors 2013, 2015, 2017, and 2019, respectively, are equal. The widths and the lengths of the fixed resistors 2013, 2015, 2017, and 2019 are also same as the widths and the lengths of the mesa gauges 2012, 2014, 2016, and 2018. Hence, the electric resistance values of the gauge portions 2013a, 2015a, 2017a, 2019a of the fixed resistors 2013, 2015, 2017, and 2019, respectively, are also equal to the electric resistance values of the gauge portions 2012a, 2014a, 2016a, and 2018a of the mesa gauges 2012, 2014, 2016, and 2018, respectively.

As are shown in FIGS. 6 and 7, the semiconductor substrate 2002 has connection regions 2042, 2044, 2046, and 2048 doped with a p-type impurity on the principal plane 2002S. Impurity concentration of the connection regions 2042, 2044, 2046, and 2048 is about $1 \times 10^{18}$ to $1 \times 10^{21}$ cm$^{-3}$. The connection regions 2042, 2044, 2046, and 2048 are formed in a same process in which the gauge portions 2012a, 2014a, 2016a, and 2018a of the mesa gauges 2012, 2014, 2016, and 2018, respectively, are formed.

The first connection region 2042 is disposed between one ends of the first low-sensitive mesa gauge 2012 and the fixed resistor 2013 and one ends of the first high-sensitive mesa gauge 2014 and the fixed resistor 2015. The first connection region 2042 includes a narrow portion 2042a narrowed considerably, and a portion 2042b and a portion 2042c, which are two portions divided by being narrowed partially. The portion 2042b and the portion 2042c account for a large proportion of the first connection region 2042 and the narrow portion 2042a accounts for an extremely small proportion. The portion 2042b and the portion 2042c are connected via the narrow portion 2042a. The portion 2042b and the portion 2042c are formed to have equal electric resistance values. One end of the gauge portion 2012a of the first low-sensitive mesa gauge 2012 and one end of the gauge portion 2013a of the fixed resistor 2013 are electrically connected via the portion 2042b. One end of the gauge portion 2014a of the first high-sensitive mesa gauge 2014 and one end of the gauge portion 2015a of the fixed resistor 2015 are electrically connected via the portion 2042c.

The second connection region 2044 is disposed between the other ends of the first high-sensitive mesa gauge 2014 and the fixed resistor 2015 and one ends of the second low-sensitive mesa gauge 2016 and the fixed resistor 2017. The second connection region 2044 includes a narrow portion 2044a narrowed considerably, and a portion 2044b and a portion 2044c, which are two portions divided by being narrowed partially. A configuration of the narrow portion 2044a, the portion 2044b, and the portion 2044c is same as the configuration of the narrow portion 2042a, the portion 2042b, and the portion 2042c of the first connection region 2042. The other end of the gauge portion 2014a of the first high-sensitive mesa gauge 2014 and the other end of the gauge portion 2015a of the fixed resistor 2015 are electrically connected via the portion 2044b. One end of the gauge portion 2016a of the second low-sensitive mesa gauge 2016 and one end of the gauge portion 2017a of the fixed resistor 2017 are electrically connected via the portion 2044c.

The third connection region 2046 is disposed between the other ends of the second low-sensitive mesa gauge 2016 and the fixed resistor 2017 and one ends of the second high-sensitive mesa gauge 2018 and the fixed resistor 2019. The third connection region 2046 includes a narrow portion 2046a narrowed considerably, and a portion 2046b and a portion 2046c, which are two portions divided by being narrowed partially. A configuration of the narrow portion 2046a, the portion 2046b, and the portion 2046c is same as the configuration of the narrow portion 2042a, the portion 2042b, and the portion 2042c of the first connection region 2042. The other end of the gauge portion 2016a of the second low-sensitive mesa gauge 2016 and the other end of the gauge portion 2017a of the fixed resistor 2017 are electrically connected via the portion 2046b. One end of the gauge portion 2018a of the second high-sensitive mesa gauge 2018 and one end of the gauge portion 2019a of the fixed resistor 2019 are electrically connected via the portion 2046c.

The fourth connection region 2048 is disposed between the other ends of the second high-sensitive mesa gauge 2018 and the fixed resistor 2019 and the other ends of the first low-sensitive mesa gauges 2012 and the fixed resistor 2013. The fourth connection region 2048 includes a narrow portion 2048a narrowed considerably, and a portion 2048b and a portion 2048c, which are two portions divided by being narrowed partially. A configuration of the narrow portion 2048a, the portion 2048b, and the portion 2048c is same as the configuration of the narrow portion 2042a, the portion 2042b, and the portion 2042c of the first connection region 2042. The other end of the gauge portion 2018a of the second high-sensitive mesa gauge 2018 and the other end of the gauge portion 2019a of the fixed resistor 2019 are electrically connected via the portion 2048b. The other end of the gauge portion 2012a of the first low-sensitive mesa gauge 2012 and the other end of the gauge portion 2013a of the fixed resistor 2013 are electrically connected via the portion 2048c.

A single first resistor 2112 is formed of the gauge portion 2012a of the first low-sensitive mesa gauge 2012 and the gauge portion 2013a of the fixed resistor 2013, and the portion 2042b of the first connection region 2042 and the portion 2048c of the fourth connection region 2048 connected, respectively, to the one ends and the other ends of the gauge portions 2012a and 2013a. The gauge portion 2013a of the fixed resistor 2013 is connected in parallel to the gauge portion 2012a of the first low-sensitive mesa gauge 2012. The portion 2042b of the first connection region 2042 and the portion 2048c of the fourth connection region 2048 are formed wide and therefore have extremely small electric resistance values. Hence, an electric resistance value of the first resistor 2112 chiefly depends on a combined resistance value of the gauge portion 2012a and the gauge portion 2013a.

A single second resistor 2114 is formed of the gauge portion 2014a of the first high-sensitive mesa gauge 2014 and the gauge portion 2015a of the fixed resistor 2015, and the portion 2042c of the first connection region 2042 and the portion 2044b of the second connection region 2044 connected, respectively, to the one ends and the other ends of the gauge portions 2014a and 2015a. The gauge portion 2015a of the fixed resistor 2015 is connected in parallel to the gauge portion 2014a of the first high-sensitive mesa gauge 2014. The portion 2042c of the first connection region 2042 and the portion 2044b of the second connection region 2044 are formed wide and therefore have extremely small electric resistance values. Hence, an electric resistance value of the second resistor 2114 chiefly depends on a combined resistance value of the gauge portion 2014a and the gauge portion 2015a.

A single third resistor 2116 is formed of the gauge portion 2016a of the second low-sensitive mesa gauge 2016 and the gauge portion 2017a of the fixed resistor 2017, and the portion 2044c of the second connection region 2044 and the portion 2046b of the third connection region 2046 connected, respectively, to the one ends and the other ends of the gauge portions 2016a and 2017a. The gauge portion 2017a of the fixed resistor 2017 is connected in parallel to the gauge portion 2016a of the second low-sensitive mesa gauge 2016. The portion 2044c of the second connection region 2044 and the portion 2046b of the third connection region 2046 are formed wide and therefore have extremely small electric resistance values. Hence, an electric resistance value of the third resistor 2116 chiefly depends on a combined resistance value of the gauge portion 2016a and the gauge portion 2017a.

A single fourth resistor 2118 is formed of the gauge portion 2018a of the second high-sensitive mesa gauge 2018 and the gauge portion 2019a of the fixed resistor 2019, and the portion 2046c of the third connection region 2046 and the portion 2048b of the fourth connection region 2048 connected, respectively, to the one ends and the other ends of the gauge portions 2018a and 2019a. The gauge portion 2019a of the fixed resistor 2019 is connected in parallel to the gauge portion 2018a of the second high-sensitive mesa gauge 2018. The portion 2046c of the third connection region 2046 and the portion 2048b of the fourth connection region 2048 are formed wide and therefore have extremely small electric resistance values. Hence, an electric resistance value of the fourth resistor 2118 chiefly depends on a combined resistance value of the gauge portion 2018a and the gauge portion 2019a. Electric resistance values of the respective resistors 2112, 2114, 2116, and 2118 under no compressive stress are equal.

As are shown in FIGS. 6 and 7, the semiconductor substrate 2002 has wirings 2022, 2024, 2026, and 2028 doped with a p-type impurity on the principal plane 2002S. Impurity concentration of the wirings 2022, 2024, 2026, and 2028 is about $1 \times 10^{18}$ to $1 \times 10^{21}$ cm$^{-3}$. The wirings 2022, 2024, 2026, and 2028 are formed in a same process in which the gauge portions 2012a, 2014a, 2016a, and 2018a of the mesa gauges 2012, 2014, 2016, and 2018, respectively, are formed.

The mesa gauges 2012, 2014, 2016, and 2018 form a full-bridge circuit in the detection portion 2010. The power-supply wiring 2028 is connected to the narrow portion 2048a of the fourth connection region 2048. The reference wiring 2024 is connected to the narrow portion 2044a of the second connection region 2044. The first resistor 2112 and the second resistor 2114 are connected in series via the narrow portion 2042a of the first connection region 2042 between the power-supply wiring 2028 and the reference wiring 2024. The fourth resistor 2118 and the third resistor 2116 are connected in series via the narrow portion 2046a of the third connection region 2046 between the power-supply wiring 2028 and the reference wiring 2024. A set of the first resistor 2112 and the second resistor 2114 and a set of the fourth resistor 2118 and the third resistor 2116 are connected in parallel between the power-supply wiring 2028 and the reference wiring 2024.

The first output wiring 2026 is connected to the narrow portion 2046a of the third connection region 2046 between the fourth resistor 2118 and the third resistor 2116. The second output wiring 2022 is connected to the narrow portion 2042*a* of the first connection region 2042 between the first resistor 2112 and the second resistor 2114.

The reference wiring 2024 is electrically connected to a reference electrode 2034. The first output wiring 2026 is electrically connected to a first output electrode 2036. The power-supply wiring 2028 is electrically connected to a power-supply electrode 2038. The second output wiring 2022 is electrically connected to a second output electrode 2032. The electrodes 2032, 2034, 2036, and 2038 are provided on the principal plane 2002S of the semiconductor substrate 2002 outside a region covered with the force transmission block 2004. The reference wiring 2024 and the power-supply wiring 2028 are formed wide and therefore have negligibly small electrical resistance values in comparison with electric resistance values of the resistors 2112, 2114, 2116, and 2118. The first output wiring 2026 and the second output wiring 2022 are formed to have equal electric resistance values.

Figure 8:
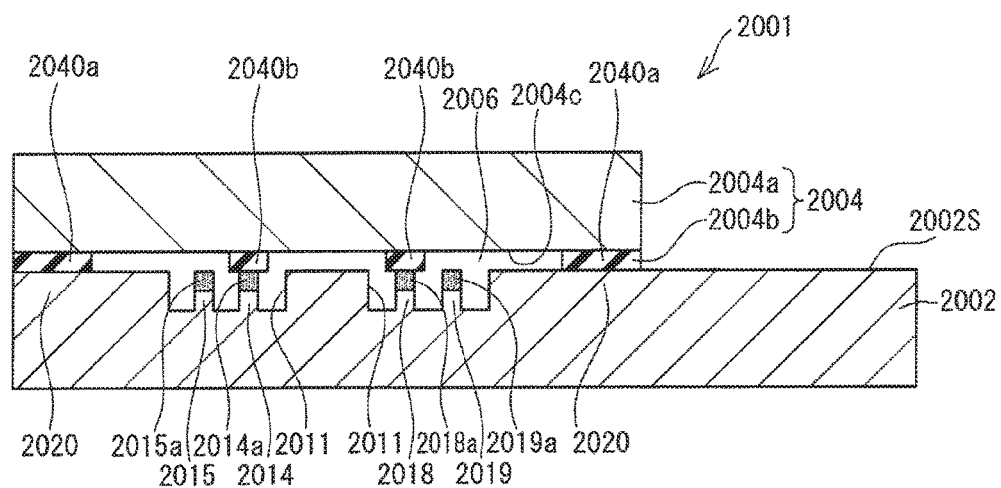
FIG. 8 is a schematic sectional view taken along the line VIII-VIII of FIG. 7.
Figure 9:
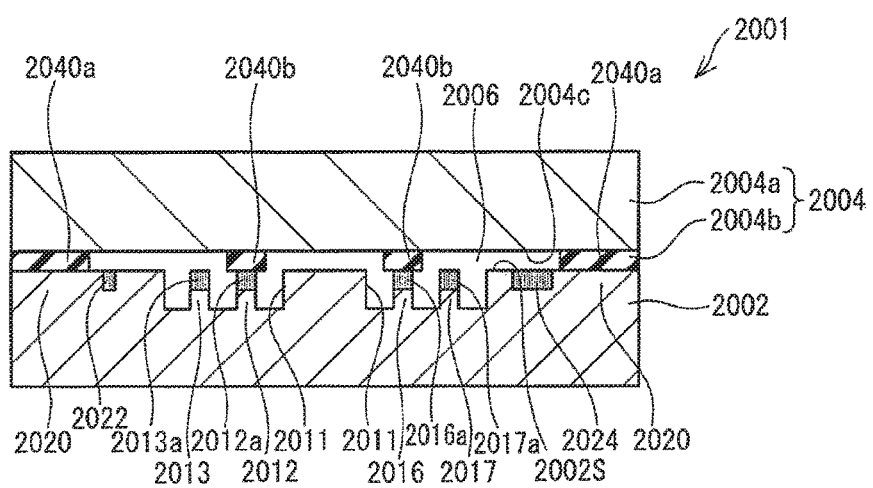
FIG. 9 is a schematic sectional view taken along the line IX-IX of FIG. 7.

As are shown in FIGS. 6, 8, and 9, the force transmission block 2004 is of a rectangular prism shape and has a silicon layer 2004*a* and an oxide silicon layer 2004*b*. The semiconductor substrate 2002 and the force transmission block 2004 are joined by exploiting a cold sold-state welding technique. More specifically, the principal plane 2002S of the semiconductor substrate 2002 and the oxide silicon layer 2004*b* of the force transmission block 2004 are joined by activating surfaces of the principal plane 2002S of the semiconductor substrate 2002 and the oxide silicon layer 2004*b* of the force transmission block 2004 using argon ion and bringing the activated surfaces into contact with each other in an ultrahigh vacuum.

Figure 10:
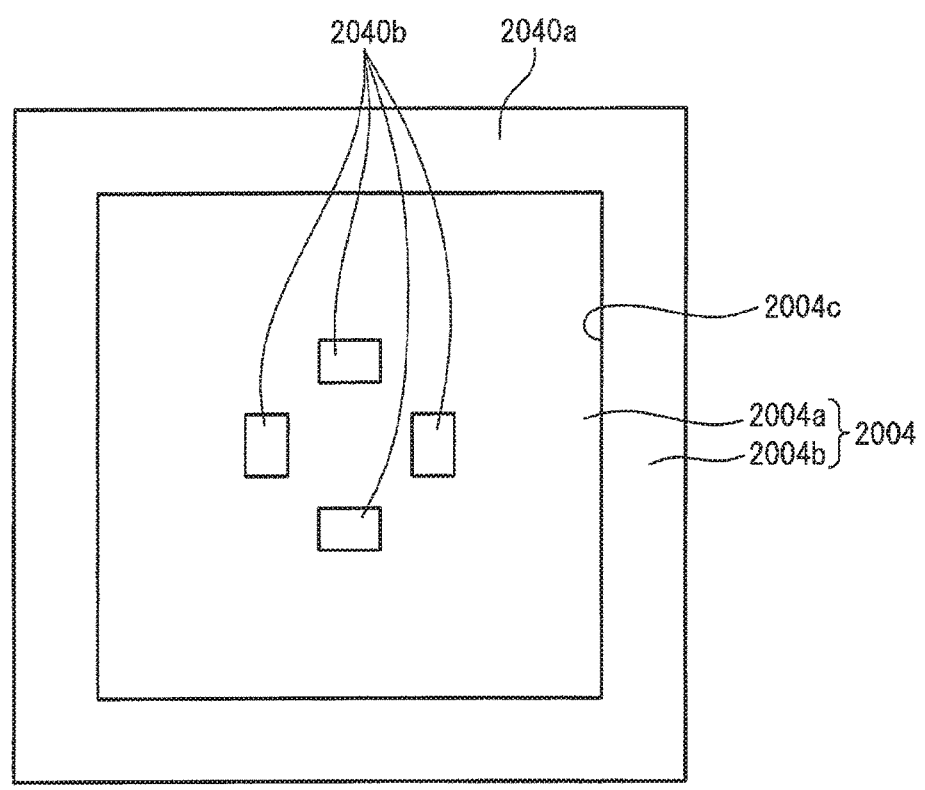
FIG. 10 is a view of the force transmission block included in the force detection device of the second example to schematically show a surface to which the semiconductor substrate is joined.

As are shown in FIGS. 8, 9, and 10, a part of the oxide silicon layer 2004*b* of the force transmission block 2004 is removed and a groove 2004*c* is provided to the force transmission block 2004 on a surface joined to the semiconductor substrate 2002. By providing the groove 2004*c*, the oxide silicon layer 2004*b* of the force transmission block 2004 is divided to a sealing portion 2040*a* and a pressing portion 2040*b*. Also, by providing the groove 2004*c* as above, a sealing space 2006 separated from an exterior is defined between the semiconductor substrate 2002 and the force transmission block 2004.

The sealing portion 2040*a* of the force transmission block 2004 is joined to the principal plane 2002S of the semiconductor substrate 2002 to surround all around the mesa gauges 2012, 2014, 2016, and 2018. A portion of the semiconductor substrate 2002 to which is joined the sealing portion 2040*a* of the force transmission block 2004 is referred to as a sealing portion 2020. Because the sealing portion 2040*a* of the force transmission block 2004 is formed in a rectangular shape, the sealing portion 2020 of the semiconductor substrate 2002 includes a section parallel to the longitudinal direction of the high-sensitive mesa gauges 2014 and 2018, and a section parallel to the longitudinal direction of the low-sensitive mesa gauges 2012 and 2016. An inner region of the sealing portion 2020 on the principal plane 2002S of the semiconductor substrate 2002 is of a square shape. The sealing portion 2020 of the semiconductor substrate 2002 and the sealing portion 2040*a* of the force transmission block 2004 are joined hermetically.

As are shown in FIGS. 6 and 7, the high-sensitive mesa gauges 2014 and 2018 are disposed at positions at which the sealing space 2006 is divided into three equal segments in the <100>-direction of the semiconductor substrate 2002 (that is, positons at which the inner region of the sealing portion 2020 is divided into three equal segments). The low-sensitive mesa gauges 2012 and 2016 are disposed at positions at which the sealing space 2006 is divided into three equal segments in the <110>-direction of the semiconductor substrate 2002 (that is, positions at which the inner region of the sealing portion 2020 is divided into three equal segments).

As are shown in FIGS. 8 and 9, the pressing portion 2040*b* of the force transmission block 2004 is joined to top surfaces of the respective mesa gauges 2012, 2014, 2016, and 2018 whereas not joined to top surfaces of the fixed resistors 2013, 2015, 2017, and 2019. Hence, although the fixed resistors 2015 and 2019 extend in the <110>-direction of the semiconductor substrate 2002 in which an electric resistance value varies considerably with compressive stress, electric resistance values of the fixed resistors 2015 and 2019 substantially remain same when a pressure is received at the transmission block 2004. Contact areas between the pressing portion 2040*b* and the top surfaces of the respective high-sensitive mesa gauges 2014 and 2018 are equal. Contact areas between the pressing portion 2040*b* and the top surfaces of the respective low-sensitive mesa gauges 2012 and 2016 are equal.

An operation of the force detection device 2001 will now be described. When the force detection device 2001 is in use, a constant current supply is connected to the power-supply electrode 2038 while the reference electrode 2034 is grounded, and a voltage measuring instrument is connected between the first output electrode 2036 and the second output electrode 2032. In the force detection device 2001, when a vessel internal pressure applied to the force transmission block 2004 varies, compressive stress applied to the gauge portions 2012*a*, 2014*a*, 2016*a*, and 2018*a* of the mesa gauges 2012, 2014, 2016, and 2018, respectively, via the force transmission block 2004 varies, too. Electric resistance values of the gauge portions 2014*a* and 2018*a*, respectively, of the high-sensitive mesa gauges 2014 and 2018 exerting a piezoresistive effect vary with compressive stress. When an electric resistance value of the gauge portion 2014*a* varies, a combined resistance value of the second resistor 2114 varies. When an electric resistance value of the gauge portion 2018*a* varies, a combined resistance value of the fourth resistor 2118 varies. Hence, a potential difference between the first output electrode 2036 and the second output electrode 2032 depends on compressive stress applied to the gauge portions 2014*a* and 2018*a*. A vessel internal pressure applied to the force transmission block 2004 is thus detected from a variance in voltage measured by the voltage measuring instrument.

Figure 12:
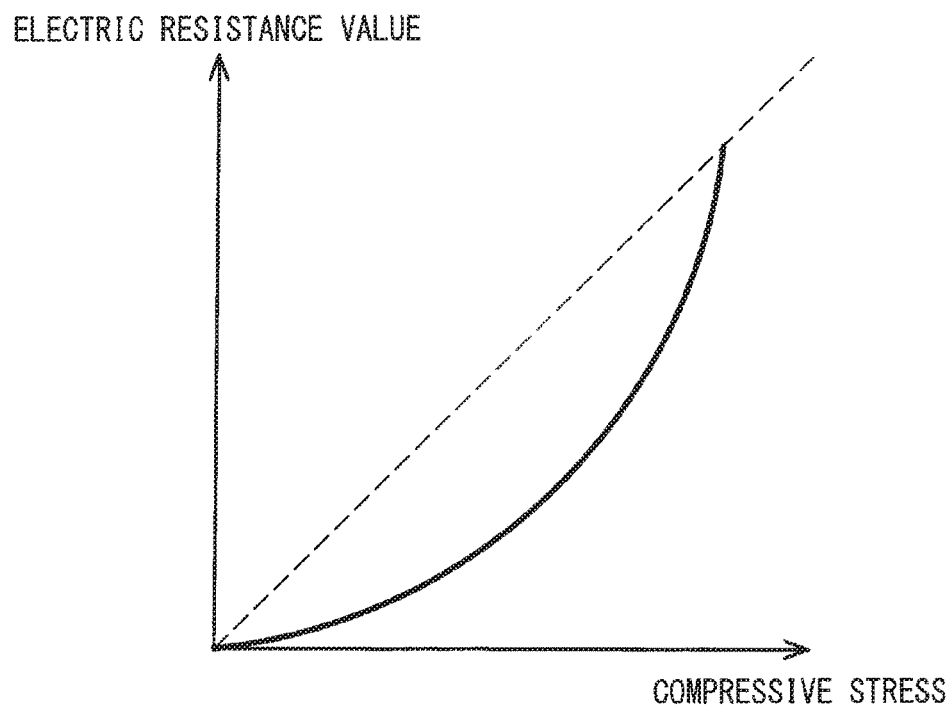
FIG. 12 shows a relationship of stress and an electric resistance value of a mesa gauge alone.

As has been described, a relationship of compressive stress and electric resistance values of the high-sensitive mesa gauges 2014 and 2018 shows downward convex non-linearity as is shown in FIG. 12. Hence, in the case of a force detection device without the fixed resistors 2013, 2015, 2017, and 2019, a potential difference between the first output electrode and the second output electrode does not vary in proportion to compressive stress applied to the gauge portions 2014*a* and 2018*a*, which results in a problem that linearity of output characteristics of the force detection device deteriorates.

The following will describe a relationship of compressive stress and a combined resistance value of a parallel-connected body C formed by connecting a fixed resistor B in parallel to a variable resistor A exhibiting proportional characteristics in a relationship of compressive stress and an electric resistance value. Let R1 be an initial resistance value of the variable resistor A, ΔR be an increased amount of an electrical resistance value of the variable resistor A, and R2 be an electric resistance value of the fixed resistor B. Then, a combined resistance value R' of the parallel-connected body C is expressed by an equation as follows.

$$R' = \frac{(R1 + \Delta R)R2}{R1 + \Delta R + R2} \qquad \text{Equation (1)}$$

By differentiating R' in the equation above with respect to ΔR, we obtain a differential value d1 expressed by an equation as follows.

$$d1 = \frac{dR'}{d\Delta R} = \left(\frac{R2}{R1 + \Delta R + R2}\right)^2 \qquad \text{Equation (2)}$$

Figure 13:
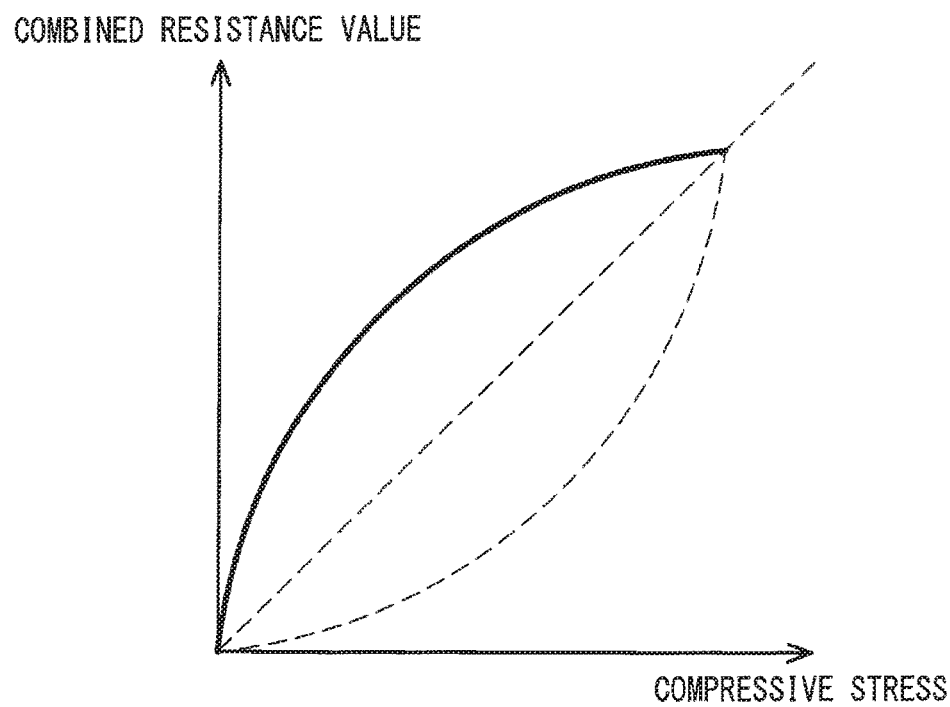
FIG. 13 shows a relationship of stress and a combined resistance value when a fixed resistor is connected in parallel to a variable resistor exhibiting proportional characteristics in a relationship of stress and an electric resistance value.

The equation above reveals that the differential value d1 takes a positive value. By further differentiating the differential value d1 with respect to ΔR, we obtain a differential value d2 that takes a negative value (equation is omitted herein). It is therefore understood from the differential values d1 and d2 that a relationship of ΔR and R' in the parallel-connected body C shows upward convex non-linearity. Hence, by connecting a fixed resistor in parallel to a variable resistor exhibiting proportional characteristics in a relationship of compressive stress and an electric resistance value, a relationship of compressive stress and the combined resistance value R' in the parallel-connected body shows upward convex non-linearity as shown in FIG. 13.

In light of the foregoing knowledge, in the force detection device 2001 of the present example, the resistors 2114 and 2118 are formed by connecting the fixed resistors 2015 and 2019 in parallel to the high-sensitive mesa gauges 2014 and 2018, respectively. Owing to the configuration as above, by introducing the fixed resistors 2015 and 2019, downward convex non-linearity of the high-sensitive mesa gauges 2014 and 2018 and upward convex non-linearity cancel each other out in a relationship of compressive stress and an electric resistance value. Consequently, a relationship of compressive stress and a combined resistance value in the resistors 2114 and 2118 has satisfactory linearity. Hence, a potential difference between the first output electrode 2036 and the second output electrode 2032 becomes substantially proportional to compressive stress applied to the gauge portion 2014a of the resistor 2114 and the gauge portion 2018a of the resistor 2118. Consequently, linearity of output characteristics of the force detection device 2001 can be improved.

In the force detection device 2001, the fixed resistors 2013, 2015, 2017, and 2019 are provided to the principal plane 2002S of the semiconductor substrate 2002 in a stepped-mesa shape. Hence, the fixed resistors 2013, 2015, 2017, and 2019 can be manufactured in a same process in which the mesa gauges 2012, 2014, 2016, and 2018 are manufactured. Because a need to provide a new process of forming the fixed resistors 2013, 2015, 2017, and 2019 is eliminated, a reduction in manufacturing efficiency of the force detection device 2001 can be restricted.

The force detection device 2001 has a sealing structure in which the detection portion 2010 of the semiconductor substrate 2002 is sealed by the force transmission block 2004. In the force detection device 2001, the ends of any one of the mesa gauges 2012, 2014, 2016, and 2018 forming a bridge circuit are not directly connected to the ends of the other mesa gauges and the connection regions 2042, 2044, 2046, and 2048 are disposed between the ends of two mesa gauges. Two mesa gauges sandwiching each of the connection regions 2042, 2044, 2046, and 2048 are electrically connected via one of the connection regions 2042, 2044, 2046, and 2048 sandwiched in between. Hence, by expanding or reducing a range within which the connection regions 2042, 2044, 2046, and 2048 are provided, a length of the mesa gauges 2012, 2014, 2016, and 2018 can be adjusted. For example, by expanding a range within which the connection regions 2042, 2044, 2046, and 2048 are provided, the mesa gauges 2012, 2014, 2016, and 2018 can be shorter and contact areas between the pressing portion 2040b of the force transmission block 2004 and the respective high-sensitive mesa gauges 2014 and 2018 can be reduced. Consequently, a vessel internal pressure applied to the force transmission block 2004 is effectively transmitted to the high-sensitive mesa gauges 2014 and 2018. Sensor sensitivity of the force detection device 2001 can be thus enhanced. Accordingly, in the force detection device 2001 having the sealing structure and including the mesa gauges 2012, 2014, 2016, and 2018 forming a bridge circuit, the mesa gauges 2012, 2014, 2016, and 2018 can be designed more flexibly to adjust sensitivity.

As has been described above, the force detection device 2001 has the sealing structure. Hence, compressive stress applied to the high-sensitive mesa gauges 2014 and 2018 depends on positions of the high-sensitive mesa gauges 2014 and 2018 in the sealing space 2006. In the present example, as is shown in FIG. 7, the high-sensitive mesa gauges 2014 and 2018 are disposed side by side in the <100>-direction of the semiconductor substrate 2002. Hence, compressive stress applied to the high-sensitive mesa gauges 2014 and 2018 depends on positions of the high-sensitive mesa gauges 2014 and 2018 in the sealing space 2006 in the <100>-direction of the semiconductor substrate 2002.

In the force detection device 1, the first high-sensitive mesa gauge 2014 and the second high-sensitive mesa gauge 2018 are disposed point-symmetric with respect to a center point 2007 (see FIGS. 6 and 7) of the inner region of the sealing portion 2020. More specifically, in the <100>-direction of the semiconductor substrate 2002, a shortest distance between the first high-sensitive mesa gauge 2014 and the sealing portion 2020 of the semiconductor substrate 2002 (the section of the sealing portion 2020 parallel to the longitudinal direction of the first high-sensitive mesa gauge 2014, which corresponds to an edge of the sealing space 2006 on a left side in a sheet surface of FIG. 7) is equal to a shortest distance between the second high-sensitive mesa gauge 2018 and the sealing portion 2020 of the semiconductor substrate 2002 (the section of the sealing portion 2020 parallel to the longitudinal direction of the second high-sensitive mesa gauge 2018, which corresponds to an edge of the sealing space 2006 on a right side in the sheet surface of FIG. 7). Hence, a force is transmitted equally to the first high-sensitive mesa gauge 2014 and the second high-sensitive mesa gauge 2018 in response to a force applied to the force transmission block 2004. Consequently, linearity of an output in response to a force applied to the force transmission block 2004 can be enhanced.

In the force detection device 2001, the high-sensitive mesa gauges 2014 and 2018 are disposed at positions at which the sealing space 2006 is divided into three equal segments in the <100>-direction of the semiconductor substrate 2002 in a center of the sealing space 2006 in the <110>-direction of the semiconductor substrate 2002. Accordingly, a force applied to the force transmission block 2004 is transmitted to the top surfaces of the high-sensitive mesa gauges 2014 and 2018 in a perpendicular direction. The high-sensitive mesa gauges 2014 and 2018 can be thus restricted from being compressed diagonally. Consequently, linearity of an output in response to a force applied to the force transmission block 2004 can be enhanced further.

In the force transmission device 2001, the connection regions 2042, 2044, 2046, and 2048 have the narrow portions 2042a, 2044a, 2046a, and 2048a, respectively, and the wirings 2022, 2024, 2026, and 2028 are connected to the narrow portions 2042a, 2044a, 2046a, and 2048a, respectively. The narrow portions 2042a, 2044a, 2046a, and 2048a account for an extremely small proportion of the connection regions 2042, 2044, 2046, and 2048, respectively. For example, in the case of connection regions without the narrow portions 2042a, 2044a, 2046a, and 2048a, a current flowing through connection regions takes different paths due to production tolerance. Such inconsistency in current paths causes deterioration of zero-point offset characteristics. On the contrary, in the case of the connection regions 2042, 2044, 2046, and 2048 including the narrow portions 2042a, 2044a, 2046a, and 2048a, respectively, paths of a current flowing through the connection regions 2042, 2044, 2046, and 2048 can be restricted. Consequently, deterioration of zero-point offset characteristics in the force detection device 2001 can be reduced.

In the force detection device 2001, the connection regions 2042, 2044, 2046, and 2048 are formed in such a manner that two portions divided by being narrowed partially (the portion 2042b and the portion 2042c, the portion 2044b and the portion 2044c, the portion 2046b and the portion 2046c, and the portion 2048b and the portion 2048c) have equal resistance values. Accordingly, initial electric resistance values of the respective resistors 2112, 2114, 2116, and 2118 become equal. Consequently, an offset voltage can be reduced in the force detection device 2001.

Third Example

Figure 11:
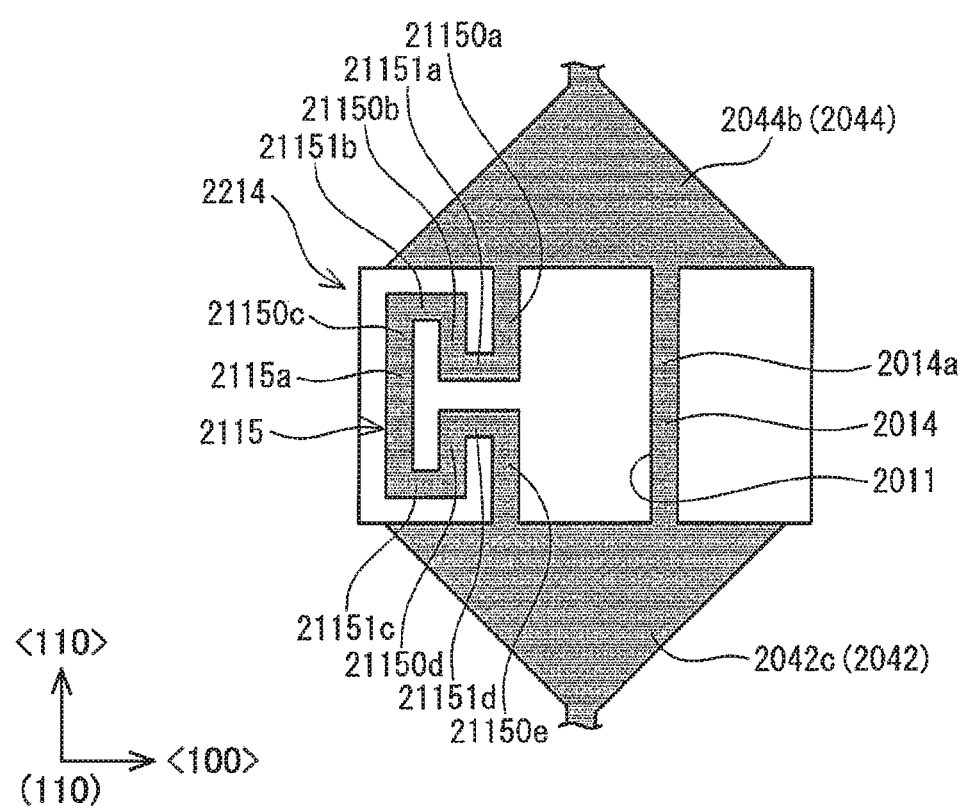
FIG. 11 is a partially enlarged view schematically showing a mesa gauge included in a force detection device of a third example.

A third example will now be described with reference to FIG. 11. The following will describe only a difference from the second example above and a detailed description is not repeated for a configuration same as the configuration of the second example above. In comparison with the resistor 2114 of the second example above, a resistor 2214 has a fixed resistor 2115 of a different shape. The fixed resistor 2115 includes portions 21150a, 21150b, 21150c, 21150d, and 21150e, and portions 21151a, 21151b, 21151c, and 21151d. The portions 21150a through 21150e extend along a <110>-direction of a semiconductor substrate 2002. The portions 21151a through 21151d extend along a <100>-direction of the semiconductor substrate 2002. Widths of the respective portions 21150a through 21150e and widths of the respective portions 21151a through 21151d are same and the widths are also same as a width of a first high-sensitive mesa gauge 2014.

One end of the portion 21150a is electrically connected to a portion 2044b of a connection region 2044 and one end of the portion 21150e is electrically connected to a portion 2042b of a connection region 2042. The portion 21150a, the portion 21151a, the portion 21150b, the portion 21151b, the portion 21150c, the portion 21151c, the portion 21150d, the portion 21151d, and the portion 21150e are sequentially connected in series in order of description. The portion 21150a and the portion 21150b oppose each other. The portion 21150e and the portion 21150d oppose each other. The portion 21150c is longer than a sum of lengths of the portion 21150b and the portion 21150d. The portion 21150b and the portion 21150d are on a same side with respect to the portion 21150c and oppose the portion 21150c. That is, the portion 21150a and the portion 21150b, the portion 21150e and the portion 21150d, and both of the portion 21150b and the portion 21150d and the portion 21150c extend and fold back along the <110>-direction of the semiconductor substrate 2002. A length of the fixed resistor 2115 (that is, a sum of lengths of the respective portions 21150a through 21150e and lengths of the respective portions 21151a through 21151d) is greater than a length of the first high-sensitive mesa gauge 2014. Hence, an electric resistance value of a gauge portion 2115a provided to a surface of the fixed resistor 2115 (in other words, a sum of electric resistance values of the respective portions 21150a through 21150e and electric resistance values of the respective portions 21151a through 21151d) is greater than an electric resistance value of a gauge portion 2014a of the first high-sensitive mesa gauge 2014 (to be more exact, an initial resistance value of the gauge portion 2014a under no compressive stress). In the present example, resistors (not shown) corresponding to the resistors 2112, 2116, and 2118 of the second example above have a configuration same as the configuration of the resistor 2214.

A functional effect same as the functional effect of the second example above can be achieved by the configuration described above. The fixed resistor 2115 is formed in such a manner that an electric resistance value of the gauge portion 2115a becomes greater than an initial resistance value of the gauge portion 2014a of the first high-sensitive mesa gauge 2014. Let R3 be an initial resistance value of a variable resistor D having a piezoresistive effect, ΔR be an increased amount of an electric resistance value of the variable resistor D under predetermined compressive stress, and R4 be an electric resistance value of a fixed resistor E. Then, sensitivity S1 of the variable resistor D alone under predetermined compressive stress is expressed by an equation as follows.

$$S1 = \frac{\Delta R}{R3} \qquad \text{Equation (3)}$$

Meanwhile, sensitivity S2 of a parallel-connected body F made up of the variable resistor D and the fixed resistor E under predetermined compressive stress is expressed by an equation as follows.

$$S2 = \frac{\frac{(R3+\Delta R)R4}{R3+\Delta R+R4} - \frac{R3R4}{R3+R4}}{\frac{R3R4}{R3+R4}} = \frac{\Delta R R4}{R3(R3+\Delta R+R4)} \qquad \text{Equation (4)}$$

A change ratio r of sensitivity is thus expressed by an equation as follows.

$$r = \frac{S2}{S1} = \frac{R4}{R3+\Delta R+R4} \qquad \text{Equation (5)}$$

The change ratio r approaches 1 as a ratio of R4 to R3 increases. By connecting a fixed resistor in parallel to a variable resistor, sensitivity of a resulting parallel-connected body falls below sensitivity of the variable resistor alone. However, it is understood that deterioration of sensitivity of the parallel-connected body can be restricted by making an electrical resistance value of the fixed resistor greater than an initial resistance value of the variable resistor. According to the configuration of the present example, linearity of output characteristics of a force detection device can be improved while restricting deterioration of sensitivity of the resistor 2214.

In the force detection device of the present example, the fixed resistor 2115 has multiple portions which extend and fold back along the <110>-direction of the semiconductor substrate 2002. Owing to the configuration as above, a relationship that an electrical resistance value of the fixed resistor 2115 is greater than an initial electric resistance value of the first high-sensitive mesa gauge 2014 can be obtained while consuming a less area of the semiconductor substrate 2002.

While the above has described examples of the techniques disclosed herein, it should be appreciated that the above is a mere illustration by examples and the force detection device disclosed herein includes various modifications and alterations of the examples above.

For example, the fixed resistors 2013, 2015, 2017, and 2019 are not limited to mesa gauges and may be diffused resistors provided to a semiconductor surface or electronic parts used as resistors. The connection regions 2042, 2044, 2046, and 2048 may be omitted. The fixed resistors 2013, 2015, 2017, and 2019 may not be parallel to the mesa gauges 2012, 2014, 2016, and 2018, respectively. It is, however, preferable that the fixed resistor values 2015 and 2019 have equal electric resistor values. Stress acting on the mesa gauges 2012, 2014, 2016, and 2018 is not limited to compressive stress and may be, for example, tensile stress instead. The force detection device is not limited to a type having the sealing structure. The mesa gauges may form a circuit other than a full-bridge circuit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A force detection device comprising:
a substrate; and
a force transmission block, wherein:
the substrate includes:
   a mesa gauge arranged on a principal plane of the substrate and providing a bridge circuit;
   a connection region arranged on the principal plane and doped with an impurity; and
   a sealing portion arranged on the principal plane, surrounding all around the mesa gauge, and connected to the force transmission block;
the mesa gauge includes:
   a first mesa gauge extending in a first direction;
   a second mesa gauge extending in a second direction different from the first direction and spaced apart from the first mesa gauge;
the connection region is disposed between one end of the first mesa gauge and one end of the second mesa gauge, and electrically connects the one end of the first mesa gauge and the one end of the second mesa gauge;
the substrate further includes a wiring arranged on the principal plane and doped with an impurity;
the connection region includes a narrow portion narrowed between the one end of the first mesa gauge and the one end of the second mesa gauge; and
the wiring is connected to the narrow portion.

2. The force detection device according to claim 1, wherein:
the force transmission block is connected to the principal plane of the substrate.

3. A force detection device comprising:
a substrate; and
a force transmission block, wherein:
the substrate includes:
   a mesa gauge arranged on a principal plane of the substrate and providing a bridge circuit;
   a connection region arranged on the principal plane and doped with an impurity; and
   a sealing portion arranged on the principal plane, surrounding all around the mesa gauge, and connected to the force transmission block;
the mesa gauge includes:
   a first mesa gauge extending in a first direction; and
   a second mesa gauge extending in a second direction different from the first direction of the substrate and spaced apart from the first mesa gauge;
the connection region is disposed between one end of the first mesa gauge and one end of the second mesa gauge, and electrically connects the one end of the first mesa gauge and the one end of the second mesa gauge;
the first direction of the substrate is a direction in which an electric resistance varies largely with stress;
the second direction of the substrate is a direction orthogonal to the first direction, in which the electrical resistance varies slightly with stress;
the first mesa gauge has a first high-sensitive mesa gauge and a second high-sensitive mesa gauge;
the second mesa gauge has a first low-sensitive mesa gauge and a second low-sensitive mesa gauge; and
the first high-sensitive mesa gauge and the second high-sensitive mesa gauge are arranged point-symmetric with respect to a center of an inner region inside of the sealing portion.

4. The force detection device according to claim 3, wherein:
the inner region has a rectangular shape;
the inner region has a pair of opposing sides extending in the first direction and another pair of opposing sides extending in the second direction; and
the first high-sensitive mesa gauge and the second high-sensitive mesa gauge are arranged at positions of the inner region, at which the inner region is divided into three equal segments in the second direction, and arranged in a center of the inner region in the first direction.

5. The force detection device according to claim 3, wherein:
the electric resistance is an electric resistance of the mesa gauge;
an electric resistance of the first mesa gauge varies largely with stress; and
an electric resistance of the second mesa gauges varies slightly with stress.

6. A force detection device comprising:
a mesa gauge; and
a fixed resistor connected in parallel to the mesa gauge, wherein:
a force is detected by using a variation of a combined resistance of the mesa gauge and the fixed resistor, and
an electric resistance of the fixed resistor is greater than an initial electric resistance of the mesa gauge under no stress.

7. The force detection device according to claim 6, wherein:
the mesa gauge is arranged on a principal plane of a semiconductor substrate in a stepped-mesa shape; and
the fixed resistor is also provided to the principal plane of the semiconductor substrate in a mesa-stepwise shape.

8. The force detection device according to claim 7, further comprising:
a force transmission block, wherein:
the force transmission block contacts with a top surface of the mesa gauge and does not contact with a top surface of the fixed resistor.

9. The force detection device according to claim 7, wherein:
the mesa gauge extends linearly along one direction; and
the fixed resistor includes a portion that extends and folds back along the one direction.

10. The force detection device according to claim 6, wherein:
the initial electric resistance is an initial electric resistance of the mesa gauge.

\* \* \* \* \*